United States Patent
Shimizu et al.

(10) Patent No.: US 9,851,925 B2
(45) Date of Patent: Dec. 26, 2017

(54) DATA ALLOCATION CONTROL APPARATUS AND DATA ALLOCATION CONTROL METHOD

(71) Applicant: FUJITSU LIMITED, Kawasaki-shi, Kanagawa (JP)

(72) Inventors: Toshihiro Shimizu, Kawasaki (JP); Miho Murata, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 100 days.

(21) Appl. No.: 14/817,449

(22) Filed: Aug. 4, 2015

(65) Prior Publication Data

US 2016/0092133 A1   Mar. 31, 2016

(30) Foreign Application Priority Data

Sep. 25, 2014   (JP) ................. 2014-195001

(51) Int. Cl.
  G06F 3/06   (2006.01)
  G06F 12/08  (2016.01)

(52) U.S. Cl.
  CPC ............ G06F 3/0673 (2013.01); G06F 3/061 (2013.01); G06F 3/064 (2013.01); G06F 12/08 (2013.01)

(58) Field of Classification Search
  None
  See application file for complete search history.

(56) References Cited

U.S. PATENT DOCUMENTS

| | | | |
|---|---|---|---|
| 2003/0046491 A1 | 3/2003 | Katsurashima | |
| 2003/0093442 A1 | 5/2003 | Mogi et al. | |
| 2009/0254702 A1 | 10/2009 | Kumano et al. | |
| 2009/0287751 A1 | 11/2009 | Hasegawa et al. | |
| 2011/0138136 A1 | 6/2011 | Shitomi et al. | |
| 2012/0173801 A1* | 7/2012 | Sasaki | G06F 3/0613 711/103 |
| 2014/0337342 A1 | 11/2014 | Kobashi et al. | |
| 2015/0100607 A1 | 4/2015 | Kobashi et al. | |
| 2015/0186048 A1 | 7/2015 | Kobashi et al. | |

FOREIGN PATENT DOCUMENTS

| | | |
|---|---|---|
| JP | 2003-5920 | 1/2003 |
| JP | 2003-150418 | 5/2003 |
| JP | 2009-157571 | 7/2009 |
| JP | 2009-277147 | 11/2009 |
| JP | 2012-517045 | 7/2012 |
| JP | 2015-075776 | 4/2015 |
| JP | 2015-125597 | 7/2015 |
| WO | 2013/114538 | 8/2013 |

* cited by examiner

*Primary Examiner* — Gary W Cygiel

(74) *Attorney, Agent, or Firm* — Fujitsu Patent Center

(57) ABSTRACT

When access to a second data block located in a second storage area occurs immediately after access to a first data block located in a first storage area, a data allocation control apparatus updates access information indicating an access sequence of the data blocks, based on identification information of the first data block and identification information of the second data block. The data allocation control apparatus determines whether to perform relocation of a first data group related to the first data block and a second data group related to the second data block, based on the access information and allocation information indicating an allocation status of the data blocks in the first storage area and the second storage area.

4 Claims, 24 Drawing Sheets

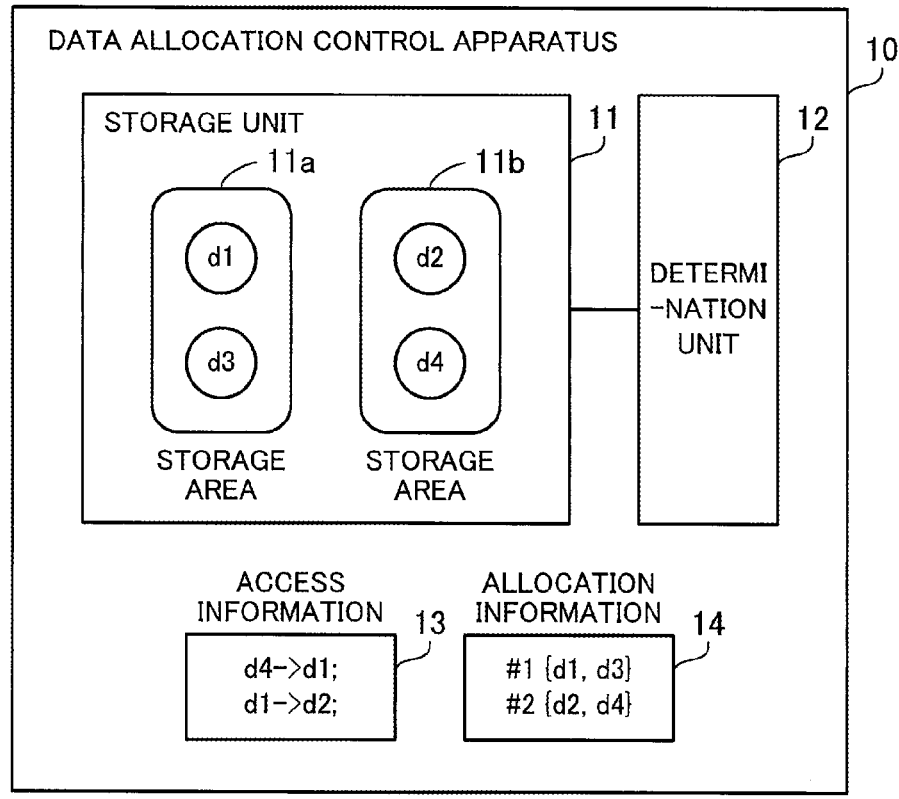
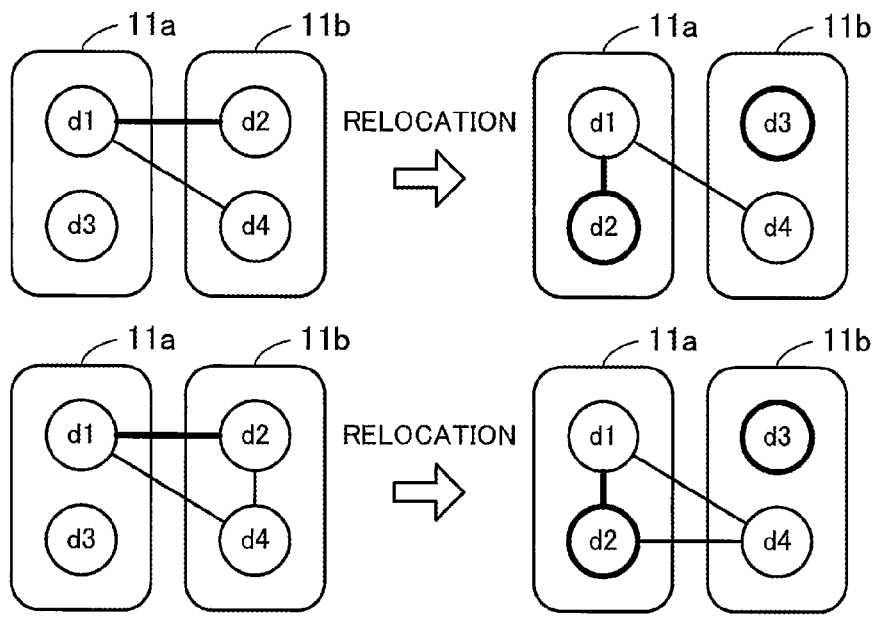
FIG. 1

FIG. 11

*123
CONTROL INFORMATION STORAGE UNIT

APPEARANCE HISTORY TABLE  *145

| RELATED DATA PAIR | NUMBER OF APPEARANCES |
|---|---|
| (a, b) | 1, 2, 2, ···, 0, 1, 0 |
| (a, c) | 0, 0, 0, ···, 1, 2, 2 |
| (a, d) | 1, 1, 1, ···, 1, 1, 1 |
| ⋮ | ⋮ |

FIG. 12

CONTROL INFORMATION STORAGE UNIT

PARAMETER TABLE  146

| PARAMETER NAME | VALUE |
|---|---|
| WRITING SPEED | xxx ms/PAGE |
| READING SPEED | xxx ms/PAGE |
| PREDICTION FORMULA (GENERAL) | $-3(x1) -(x2) +2(x3) +0.03(x4)$ |
| PREDICTION FORMULA (a, b) | $(x1) +(x2) +10(x3)$ |
| ⋮ | ⋮ |

FIG. 16

```
                                            ─ 123
┌─────────────────────────────────────┐
│  CONTROL INFORMATION STORAGE UNIT   │
│                                     │
│    COORDINATE TABLE    ─ 147        │
│   ┌──────────┬──────────────┐       │
│   │ NODE ID  │ COORDINATES  │       │
│   ├──────────┼──────────────┤       │
│   │    Q     │    (1, 6)    │       │
│   ├──────────┼──────────────┤       │
│   │    R     │    (5, 2)    │       │
│   ├──────────┼──────────────┤       │
│   │    e     │    (6, 3)    │       │
│   ├──────────┼──────────────┤       │
│   │    f     │    (3, 6)    │       │
│   ├──────────┼──────────────┤       │
│   │    g     │    (4, 3)    │       │
│   ├──────────┼──────────────┤       │
│   │    h     │    (4, 1)    │       │
│   ├──────────┼──────────────┤       │
│   │    ⋮     │      ⋮       │       │
│   └──────────┴──────────────┘       │
└─────────────────────────────────────┘
```

FIG. 21

CONTROL INFORMATION STORAGE UNIT ─ 123

REGRESSOR TABLE ─ 148

| ONE-DAY-BEFORE FLAG | TWO-DAYS-BEFORE FLAG | PAST APPEARANCE RATE | SEASON | NUMBER OF APPEARANCES IN FUTURE |
|---|---|---|---|---|
| 0 | 1 | 0.3 | 3 | 5 |
| 1 | 0 | 0.5 | 2 | 7 |
| 1 | 1 | 0.7 | 0 | 10 |
| 0 | 1 | 0.2 | 0 | 3 |
| 1 | 1 | 0.8 | 1 | 12 |
| ⋮ | ⋮ | ⋮ | ⋮ | ⋮ |

FIG. 23

CONTROL INFORMATION STORAGE UNIT

REGRESSOR TABLE 148

| ONE-DAY-BEFORE FLAG | TWO-DAYS-BEFORE FLAG | PAST APPEARANCE RATE | SEASON | NUMBER OF APPEARANCES IN FUTURE |
|---|---|---|---|---|
| 1 | 0 | 0.3 | 1 | 4 |
| 0 | 1 | 0.5 | 1 | 5 |
| 1 | 0 | 0.7 | 1 | 8 |
| 0 | 1 | 0.2 | 2 | 3 |
| 1 | 0 | 0.8 | 2 | 8 |
| ⋮ | ⋮ | ⋮ | ⋮ | ⋮ |

123

DATA ALLOCATION CONTROL APPARATUS AND DATA ALLOCATION CONTROL METHOD

CROSS-REFERENCE TO RELATED APPLICATION

This application is based upon and claims the benefit of priority of the prior Japanese Patent Application No. 2014-195001, filed on Sep. 25, 2014, the entire contents of which are incorporated herein by reference.

FIELD

The embodiments discussed herein are related to a data allocation control apparatus and a data allocation control method.

BACKGROUND

When a computer handles a large amount of data, a low-speed high-capacity storage device such as a hard disk drive (HDD) is often used as a non-volatile storage device for storing data. However, if an access is made to such a low-speed storage device each time an access request is issued, data access becomes a bottleneck so that the processing performance of the computer might be reduced. One way to address such a problem may be to use a memory such as a random access memory (RAM) that allows high-speed random access as a cache memory.

For example, there has been proposed a data management apparatus that stores in the HDD a plurality of data blocks grouped into segments, and caches data blocks from the HDD to the RAM in units of segments. Upon receiving a read request specifying a certain data block, the data management apparatus loads the whole segment including the specified data block from the HDD to the RAM. The data blocks loaded (cached) in the RAM are stored without being immediately discarded. Thereafter, upon receiving a read request specifying one of the cached data blocks, the data management apparatus acquires the specified data block from the RAM instead of reading the specified data block from the HDD, and provides the acquired data block.

Further, the data management apparatus records the history of read requests, and analyzes the relationship between data blocks that are likely to be sequentially read. The data management apparatus changes the allocation of data blocks in the HDD such that the data blocks that are likely to be sequentially read belong to the same segment. This increases the likelihood that the specified data block is cached in the RAM. Thus, it is possible to reduce access to the HDD, and thereby improve the access performance.

See, for example, International Publication Pamphlet No. WO2013/114538.

In the data management apparatus described above, however, access to the low-speed storage device might not be reduced due to excessive relocation of data.

Data blocks of a specific pair tend to be sequentially accessed. This characteristic (locality) is not permanent, but may change in accordance with the operation of the information processing system. When the locality changes, the effect of reducing access due to the previous data relocation decreases. That is, the benefits of data relocation last for only a limited period of time, and the amount of the benefits is finite. In the data management apparatus described above, when the locality changes, another pair of data blocks that tend to be sequentially accessed is detected. Thus, data relocation is performed again for the detected pair of data blocks. On the other hand, data relocation often temporarily increases writing to a low-speed storage device, which incurs some cost.

Accordingly, if data relocation is performed each time a new pair of data blocks that tend to be sequentially accessed is detected, benefits that are worth the cost of data relocation might not be obtained. Thus, access to the low-speed storage device might not be reduced.

SUMMARY

According to one aspect of the invention, there is provided a non-transitory computer-readable storage medium storing therein a data allocation control program that causes a computer to perform a process including: receiving access to a plurality of data blocks that are classified and located in a plurality of storage areas in a storage device; updating access information, when access to a second data block located in a second storage area of the plurality of storage areas occurs immediately after access to a first data block located in a first storage area of the plurality of storage areas, based on identification information of the first data block and identification information of the second data block, the access information indicating an access sequence of the plurality of data blocks; and determining whether to perform relocation of a first data group related to the first data block and a second data group related to the second data block, based on the access information and allocation information, the allocation information indicating an allocation status of the data blocks in the first storage area and the second storage area.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 illustrates a data allocation control apparatus according to a first embodiment;

FIG. 11 illustrates an example of an appearance history table;

FIG. 12 illustrates an example of a parameter table;

FIG. 16 illustrates an example of a coordinate table;

FIG. 21 illustrates an example of a regressor table;

FIG. 23 illustrates an example of a change in a reappearance prediction formula.

DESCRIPTION OF EMBODIMENTS

Figure 2:
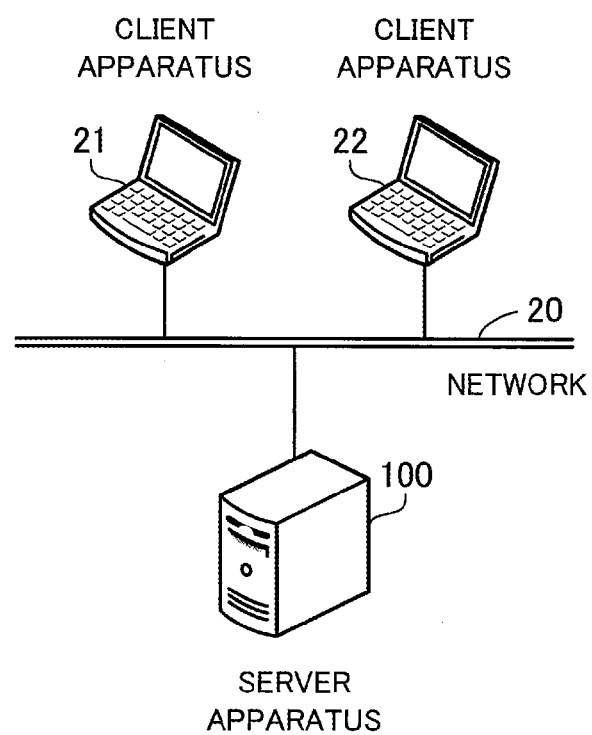
FIG. 2 illustrates an information processing system according to a second embodiment.

Embodiments will be described below with reference to the accompanying drawings, wherein like reference numerals refer to like elements throughout.

(a) First Embodiment

FIG. 1 illustrates a data allocation control apparatus 10 according to a first embodiment.

The data allocation control apparatus 10 of the first embodiment includes a storage unit 11 and a determination unit 12.

The storage unit 11 is a storage device that is relatively slow for random access. Examples of the storage unit 11 may include an HDD, a tape, a rewritable disc medium, a non-volatile semiconductor memory, and the like. The data allocation control apparatus 10 may use, as a cache memory for the storage unit 11, a storage device that is relatively fast for random access. Examples of the cache memory may include a RAM, a flash memory, and the like.

The determination unit 12 controls data allocation in the storage unit 11 so as to improve the performance of access to the storage unit 11. The determination unit 12 may be implemented as a processor, for example. The processor may be a central processing unit (CPU) or a digital signal processor (DSP). Further, the processor may include an application specific electronic circuit such as an application specific integrated circuit (ASIC), a field programmable gate array (FPGA), and the like. The processor executes a program stored in a memory such as a RAM, for example. A set of multiple processors (a multiprocessor) may also be referred to as a "processor".

The storage unit 11 is provided with a plurality of storage areas including storage areas 11a and 11b. The storage areas 11a and 11b are often referred to as "pages" or "segments". One or more data blocks are located in each of the storage areas 11a and 11b. An access request specifies a data block as an object to be read or written. However, in the case of using a cache memory, in order to reduce access to the storage unit 11, transfer between the storage unit 11 and the cache memory may be performed in units of storage areas.

For example, as illustrated in FIG. 1, data blocks d1 and d3 are located in the storage area 11a. Further, data blocks d2 and d4 are arranged in the storage area 11b. In the case of accessing the data blocks d1 and d3 sequentially, since the data blocks d1 and d3 are located in the same storage area, high speed access is possible. Also, in the case of accessing the data blocks d2 and d4 sequentially, since the data blocks d2 and d4 are located in the same storage area, high speed access is possible.

The determination unit 12 receives access to the data blocks d1, d2, d3, and d4 located in the storage areas 11a and 11b. Access to the data blocks d1, d2, d3, and d4 may occur in response to a request from the outside of the data allocation control apparatus 10, or may occur in response to a request from software running on the data allocation control apparatus 10.

The determination unit 12 detects that access to the data block d2 located in the storage area 11b has occurred, immediately after access to the data block d1 located in the storage area 11a. Then, the determination unit 12 updates access information 13, based on identification information of the data block d1 and identification information of the data block d2. The access information 13 indicates the access sequence of the plurality of data blocks. For example, the access information 13 indicates that the data block d1 is accessed immediately after the data block d4, and that the data block d2 is accessed immediately after the data block d1. The access information 13 is stored, for example, in a non-volatile storage device, such as an HDD and the like, or a volatile storage device, such as a RAM and the like, provided in the data allocation control apparatus 10.

The determination unit 12 determines whether to perform relocation of a first data group related to the data block d1 and a second data group related to the data block d2 that is accessed immediately after the data block d1, based on the updated access information 13 and the allocation information 14. The allocation information 14 indicates the current allocation status of the data blocks in the storage areas 11a and 11b.

For example, the allocation information 14 indicates that the data blocks d1 and d3 are located in the storage area 11a, and that the data blocks d2 and d4 are located in the storage area 11b. The allocation information 14 is stored, for example, in a non-volatile storage device, such as an HDD and the like, or a volatile storage device, such as a RAM and the like, provided in the data allocation control apparatus 10. The first data group includes a data block that is located in the storage area 11a or the storage area 11b, and that is accessed immediately before or after the data block d1, for example. The second data group includes a data block that is located in the storage area 11a or the storage area 11b, and that is accessed immediately before or after the data block d2, for example.

The determination unit 12 calculates, for example, an evaluation value indicating the effect (benefit) of improving access performance due to relocation, based on the access information 13 and the allocation information 14. The evaluation value may be calculated based on the difference between the current allocation status and the allocation status to be obtained in the case where the relocation is performed. In the case of focusing on sequential access across the storage areas 11a and 11b, the determination unit 12 counts the number of pairs of data blocks, each pair being split across different storage areas (the number of splits) in the current allocation status, among pairs of sequentially accessed data blocks indicated by the access information 13. Similarly, the determination unit 12 counts the number of splits in the allocation status to be obtained in the case where relocation is performed. The determination unit 12 may calculate an evaluation value proportional to the difference in the number of splits before and after relocation.

When the evaluation value is calculated, the determination unit 12 compares the evaluation value with a threshold indicating the cost of relocation, and determines to perform relocation if the evaluation value is greater than the threshold (if the benefit is greater than the cost), for example. The cost of relocation indicates access to the storage unit 11 which is temporarily increased due to rewriting in the storage areas 11a and 11b. If relocation is determined to be performed, the determination unit 12 executes relocation in the storage unit 11. However, in the case where the cache memory is being used, the determination unit 12 may perform rewriting in the storage areas 11a and 11b when the data blocks d1, d2, d3, and d4 are evicted from the cache memory.

For example, it is assumed that the data block d1 is accessed immediately after the data block d4, and the data block d2 is accessed immediately after the data block d1. It is further assumed that relocation that allocates the data blocks d1 and d2 in the same storage area is considered. In this case, in the allocation status before relocation, each of the pairs of data blocks (d1, d2) and (d1, d4) is split across different storage areas as illustrated in FIG. 1. On the other hand, in the case where relocation that swaps the data blocks d1 and d2 is performed so as to reduce the imbalance in the number of data blocks, only the pair of data blocks (d1, d4) is split across different storage areas, as illustrated in FIG. 1. Accordingly, the number of splits is reduced by 1 by the relocation. If the benefit corresponding to the reduction in the number of splits by 1 is greater than the cost, this relocation is determined to be performed. On the other hand, if the benefit corresponding to the reduction in the number of splits by 1 is less than or equal to the cost, this relocation is determined not to be performed.

In another example, in addition to the assumptions described above, it is further assumed that the data block d4 is accessed immediately after the data block d2. In this case, in the allocation status before relocation, each of the pairs of data blocks (d1, d2) and (d1, d4) is split across different storage areas as illustrated in FIG. 1. On the other hand, in the case where relocation that swaps the data blocks d1 and d2 is performed, the pair of data blocks (d2, d4) is split across different storage areas in addition to the pair of data blocks (d1, d4), as illustrated in FIG. 1. That is, although a split of one pair of data blocks is resolved, another pair of data blocks is newly split. Accordingly, the number of splits is not reduced by the relocation. Usually, this relocation is determined not to be performed.

According to the data allocation control apparatus 10 of the first embodiment, a determination as to whether to perform relocation is made based on the access information 13 indicating the access sequence of a plurality of data blocks and the allocation information 14 indicating the current allocation status of the data blocks in the storage areas 11a and 11b. It is possible to evaluate the effect of improving access performance due to relocation, based on pairs of sequentially accessed data blocks and the allocation status of these pairs of data blocks. For example, it is possible to evaluate the reduction in the number of pairs of data blocks split across different storage areas as the effect of improving access performance. Accordingly, compared to the case in which data relocation is performed each time a pair of sequentially accessed data blocks is detected, it is possible to prevent relocation that has little effect of improving access performance.

(b) Second Embodiment

FIG. 2 illustrates an information processing system according to a second embodiment.

The mobile communication system of the second embodiment includes client apparatuses 21 and 22, and a server apparatus 100. The client apparatuses 21 and 22 and the server apparatus 100 are connected to a network 20. The network 20 may include a local area network (LAN), and a wide area network such as the Internet and the like.

Each of the client apparatuses 21 and 22 is a client computer as a terminal apparatus operated by the user. Each of the client apparatuses 21 and 22 performs information processing using data managed by the server apparatus 100. In doing so, each of the client apparatuses 21 and 22 transmits an access request to the server apparatus 100 via the network 20. The access request may be a read request issued upon acquiring certain data, or may be a write request issued upon updating certain data.

The server apparatus 100 is a server computer that manages data stored in a non-volatile storage device. The server apparatus 100 executes, for example, a database management system (DBMS). Upon receiving an access request from either of the client apparatuses 21 and 22, the server apparatus 100 executes access to data specified in the access request, and returns the execution result to the source of the access request. If a read request is received, the server apparatus 100 reads the specified data, and transmits the read data. If a write request is received, the server apparatus 100 updates the specified data, and notifies of whether the update is successful.

In order to increase the data access speed, the server apparatus 100 uses a high-speed low-capacity cache memory in addition to a low-speed high-capacity non-volatile storage device. In the second embodiment, an HDD is used as the former, and a RAM is used as the latter. However, a solid state drive (SSD), a flash memory, an optical disc, a magneto-optical disc, a tape, or the like may be used as the former, and a flash memory or the like may be used as the latter.

Upon receiving an access request specifying certain data for the first time, the server apparatus 100 loads a data set including the specified data from the HDD to the RAM. The data loaded in the RAM is stored even after execution of access without being immediately deleted. Thereafter, upon receiving an access request specifying data loaded (data cached) in the RAM, the server apparatus 100 may execute access without loading the data from the HDD to the RAM again. Note that the server apparatus 100 is an example of the data allocation control apparatus 10 of the first embodiment.

Figure 3:
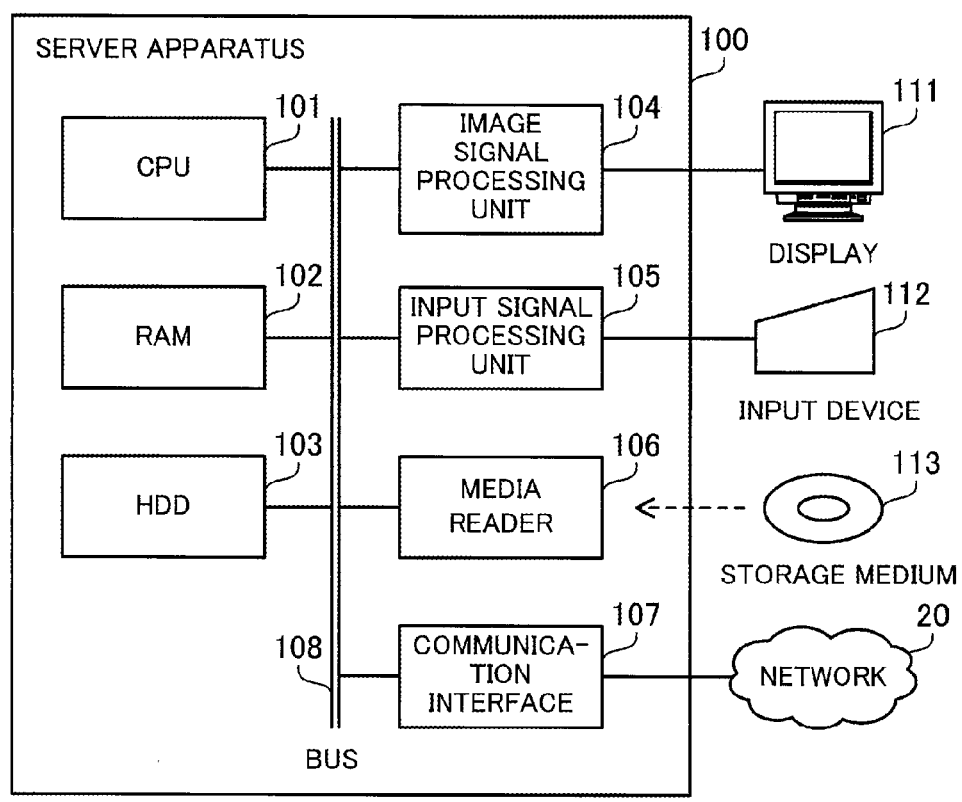
FIG. 3 is a block diagram illustrating an example of hardware of a server apparatus.

FIG. 3 is a block diagram illustrating an example of the server apparatus 100.

The server apparatus 100 includes a CPU 101, a RAM 102, an HDD 103, an image signal processing unit 104, an input signal processing unit 105, a media reader 106, and a communication interface 107. Each of the components described above is connected to a bus 108 in the server apparatus 100. The CPU 101 is an example of the determination unit 12 of the first embodiment. The HDD 103 is an example of the storage unit 11 of the first embodiment.

The CPU 101 is a processor including an arithmetic circuit that executes instructions of a program. The CPU 101 loads at least part of a program and data stored in the HDD 103 into the RAM 102 so as to execute the program. Note that the CPU 101 may include multiple processor cores, and the server apparatus 100 may include multiple processors. Thus, processes described below may be executed in parallel by using multiple processors or processor cores. A set of multiple processors (a multiprocessor) may be referred to as a "processor".

The RAM 102 is a volatile semiconductor memory that temporarily stores a program executed by the CPU 101 and data used for processing by the CPU 101. The server apparatus 100 may include other types of memories than a RAM, and may include a plurality of memories.

The HDD 103 is a non-volatile storage device that stores programs of software (such as an operation system (OS), middleware, application software, and the like) and data. The programs include a data allocation control program that controls allocation of data in the HDD 103. Note that the server apparatus 100 may include other types of storage devices such as a flash memory, an SSD, and the like, and may include a plurality of non-volatile storage devices.

The image signal processing unit 104 outputs an image to a display 111 connected to the server apparatus 100, in accordance with an instruction from the CPU 101. Examples of the display 111 include a cathode ray tube (CRT) display, a liquid crystal display (LCD), a plasma display panel (PDP), an organic electro-luminescence (OEL) display, and the like.

The input signal processing unit 105 obtains an input signal from an input device 112 connected to the server apparatus 100, and outputs the input signal to the CPU 101. Examples of the input device 112 include a pointing device (such as a mouse, a touch panel, a touch pad, a trackball, and the like), a keyboard, a remote controller, a button switch, and the like. A plurality of types of input devices may be connected to the server apparatus 100.

The media reader 106 is a reading device that reads a program and data stored in a storage medium 113. Examples of the storage medium 113 include a magnetic disc (such as a flexible disk (FD), an HDD, and the like), an optical disc (such as a compact disc (CD), a digital versatile disc (DVD), and the like), a magneto-optical disc (MO), a semiconductor memory, and the like. The media reader 106 reads, for example, a program and data from the storage medium 113, and stores the read program and data in the RAM 102 or the HDD 103.

The communication interface 107 is connected to the network 20, and communicates with the client apparatuses 21 and 22 via the network 20. The communication interface 107 may be a wired communication interface connected to a communication apparatus such as a switch with a cable, or may be a radio communication interface connected to a base station or an access point via a radio link.

The server apparatus 100 does not have to include the media reader 106. If the server apparatus 100 is controllable from a terminal apparatus operated by the user, the server apparatus 100 does not need to include the image signal processing unit 104 or the input signal processing unit 105. Further, the display 111 and the input device 112 may be integrally formed with the housing of the server apparatus 100. The client apparatuses 21 and 22 may be implemented with the same hardware configuration as that of the server apparatus 100.

Next, a description will be given of caching of data and allocation of data in the HDD 103.

Figure 4:
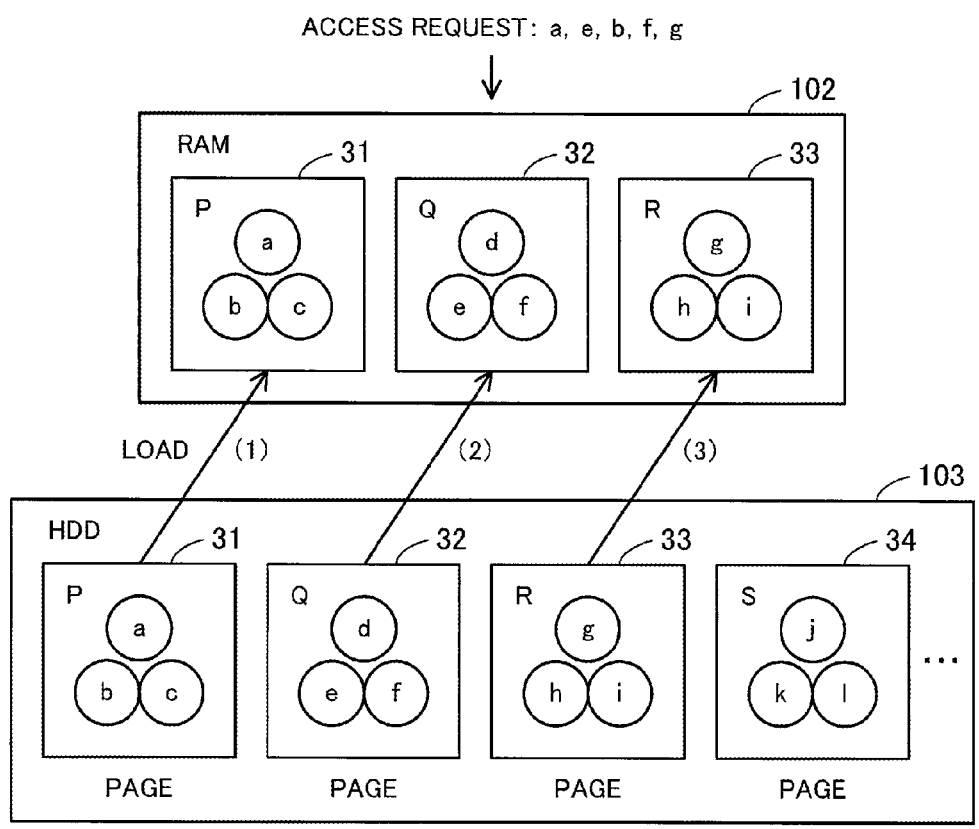
FIG. 4 illustrates an example of loading pages to a cache memory.

FIG. 4 illustrates an example of loading pages to a cache memory.

The server apparatus 100 divides the storage area of the HDD 103 into a plurality of pages. Thus, the server apparatus 100 reads data from the HDD 103 and writes data to the HDD 103 in units of pages. Each page is one physical continuous storage area. A page is often called a segment. The page size may be the same or vary among a plurality of pages. Each page is capable of containing a plurality of data blocks. In the case a relational database management system (RDBMS) is executed in the server apparatus 100, each data block corresponds to one tuple in a table, for example. Each data block may be identified by a primary key or a sequential number other than a primary key.

For example, the HDD 103 includes a page 31 (page P), a page 32 (page Q), a page 33 (page R), and a page 34 (page S). The page 31 includes data blocks a, b, and c. Similarly, the page 32 includes data blocks d, e, and f; the page 33 includes data blocks g, h, and I; and the page 34 includes data blocks j, k, and l. As mentioned above, reading of data from the HDD 103 and writing of data to the HDD 103 are performed in units of pages. Accordingly, in the following description, reading or writing of all the data blocks of a page may be simply referred to as reading or writing the data of a page. Note that there is an upper limit on the number of data blocks that each page may contain.

Upon receiving an access request, the server apparatus 100 searches for a page including the data block specified by the received access request, and loads the data of the found page from the HDD 103 to the RAM 102. Then, the server apparatus 100 accesses data in the RAM 102 in accordance with the access request. The server apparatus 100 provides a data block loaded in the RAM 102 in response to a read request, and updates a data block loaded in the RAM 102 in response to a write request. The data loaded in the RAM 102 is used as cached data for the HDD 103 without being immediately discarded. If an access request received later specifies a data block included in the cached page, the server apparatus 100 may use the data in the RAM 102 without reading the data block from the HDD 103 again.

For example, it is assumed that the server apparatus 100 sequentially receives access requests specifying the data block a, the data block e, the data block b, the data block f, and the data block g, respectively. First, in response to the access request specifying the data block a, the server apparatus 100 loads the data of the page 31 to which the data block a belongs (the entire page 31 including the data blocks a, b, and c) to the RAM 102. Then, in response to the access request specifying the data block e, the server apparatus 100 loads the data of the page 32 to which the data block e belongs (the entire page 32 including the data blocks d, e, and f) to the RAM 102.

Then, in response to the access request specifying the data block b, since the page 31 to which the data block b belongs is cached, the server apparatus 100 uses the data block b that is present in the RAM 102 without accessing the HDD 103 again. Then, in response to the access request specifying the data block f, since the page 32 to which the data block f belongs is cached, the server apparatus 100 uses the data block f that is present in the RAM 102 without reading the data block f from the HDD 103 again. Then, in response to the access request specifying the data block g, the server apparatus 100 loads the data of the page 33 to which the data block g belongs (the entire page 33 including the data blocks g, h, and i) to the RAM 102.

Figure 5:
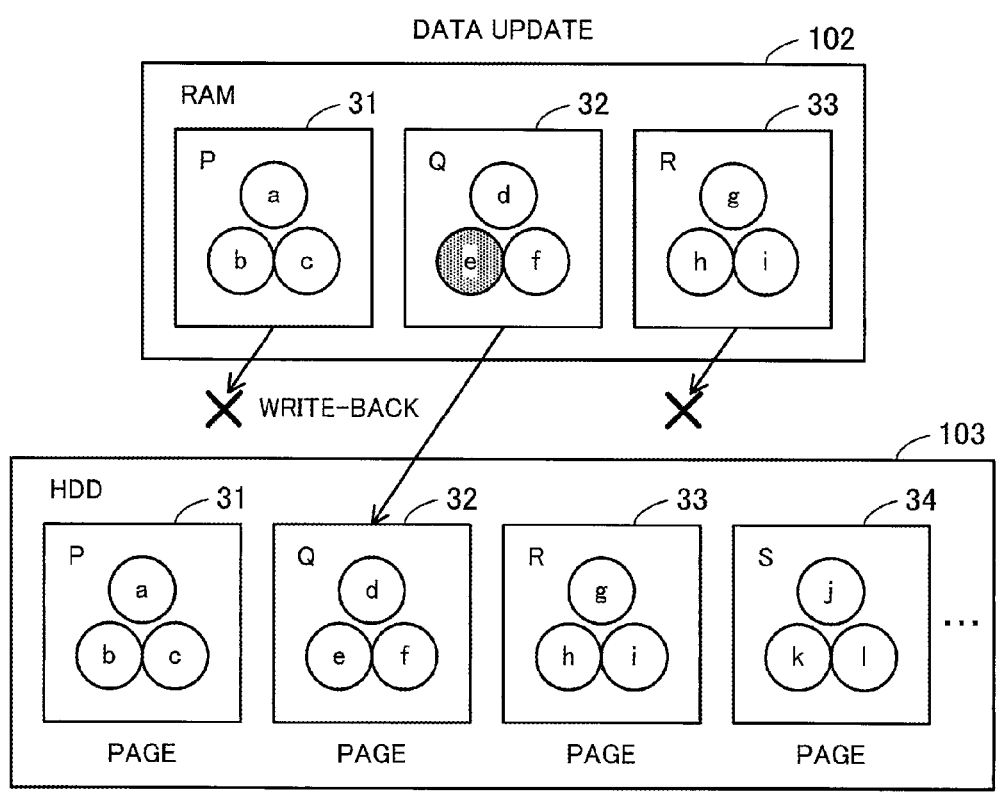
FIG. 5 illustrates an example of writing back a page whose data is updated.

FIG. 5 illustrates an example of writing back a page whose data is updated.

The storage area (cache area) of the RAM 102 usable as a cache memory is smaller than the storage area of the HDD 103 that stores data. Accordingly, if there is not enough space in the cache area of the RAM 102, data of any of the pages needs to be evicted from the RAM 102. For example, it is assumed that upon attempting to load the data of the page 34 to the RAM 102, the pages 31, 32, and have been cached, and therefore there is not enough space in the cache area. In this case, the server apparatus 100 may free up space in the cache area by evicting data of at least one of the pages 31 through 33 from the RAM 102.

In doing so, as for the page not including an updated data block, the server apparatus 100 may discard the data of the page in the RAM 102, and does not need to write back the data to the HDD 103. On the other hand, as for the page including an updated data block, the server apparatus 100 needs to write the data of the page to the HDD 103.

For example, it is assumed that only the data block e of the data blocks a, b, c, d, e, f, g, h and i is updated in accordance with an access request. In order to reduce writing to the HDD 103, the update of the data block e is not immediately reflected to the HDD 103. In this case, upon evicting the data of the page 31 from the RAM 102, the data of the page 31 may be simply discarded. Discarding of data in the RAM 102 may also be realized by overwriting with other data in the storage area where the data to be discarded has been stored, without performing explicit erasure processing. Similarly, upon evicting the data of the page 33 from the RAM 102, the data of the page 33 may be simply discarded.

On the other hand, upon evicting the data of the page 32 from the RAM 102, the server apparatus 100 writes back the data (the entire page 32 including the data blocks d, e, and f) of the page 32 to the HDD 103 in order to reflect the update of the data block e to the HDD 103. However, the timing of reflecting the update of data in the RAM 102 to the HDD 103 does not have to be limited to the timing of evicting cached data from the RAM 102. For example, the server apparatus 100 may periodically check whether there is a page including an updated data block, and perform write-back.

If data of a page is cached in the RAM 102, the page does not need to be read from the HDD 103 in response to an access request specifying a data block belonging to the page. In order to improve the data access performance utilizing a small cache area, it is preferable that data blocks that are likely to be sequentially accessed be located in the same page. Thus, the server apparatus 100 records the history of the access sequence of data blocks, and dynamically changes the data allocation (which data block is located in which page) in the HDD 103 based on the history.

Figure 6:
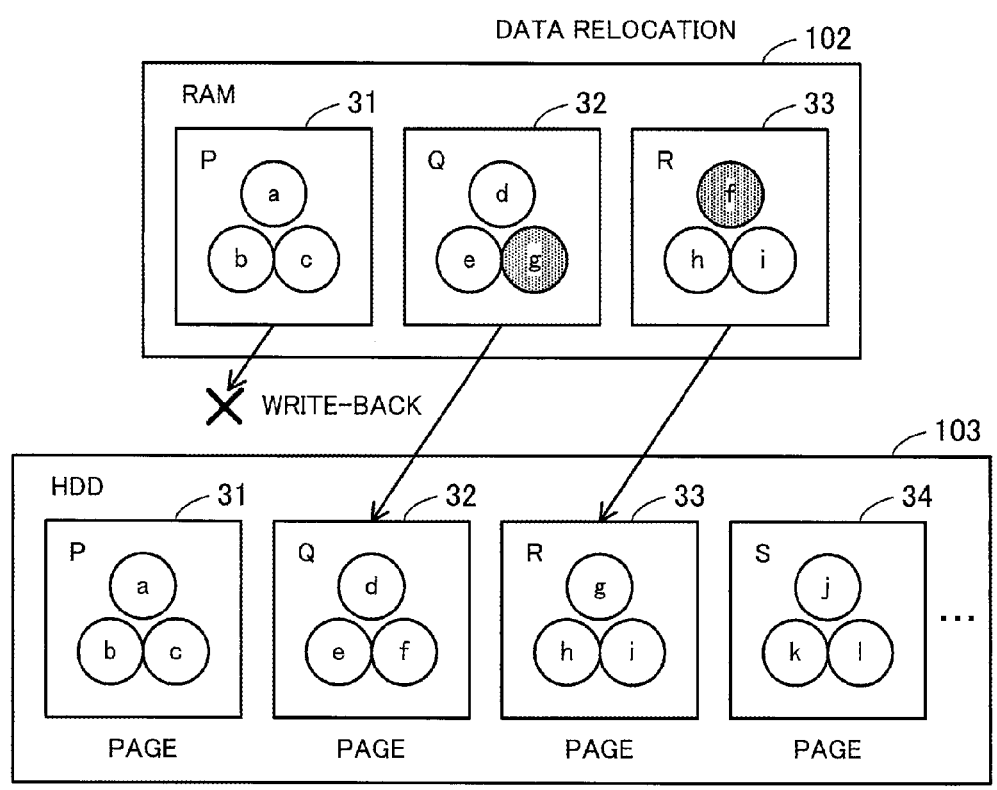
FIG. 6 illustrates an example of writing back pages on which data relocation is performed.

FIG. 6 illustrates an example of writing back pages on which data relocation is performed.

For example, it is assumed that the server apparatus 100 receives an access request specifying the data block e from the client apparatus 21 and, immediately after that, receives an access request specifying the data block g. However, at this point, the data block e belongs to the page 32, and the data block g belongs to the page 33. Accordingly, at the point of reception of the access request specifying the data block g, the data of the page 33 might have not been cached (a cache miss might occur), and therefore read-out from the HDD 103 might occur. If the data block e and the data block g are likely to be accessed in this order in the future, it is preferable that the data block e and the data block g belong to the same page.

Thus, the server apparatus 100 may perform relocation between the page 32 to which the data block e belongs and the page 33 to which the data block g belongs such that the data blocks e and g belong to the same page. For example, the server apparatus 100 swaps the data block e and the data block g. Thus, the page 32 includes the data blocks d, e, and g, and the page 33 includes the data blocks f, h, and i. Accordingly, in the case where the data block e and the data block g are accessed in this order in the future, the data of the page 32 including the data block g is cached to the RAM 102 at the time of access to the data block e, and read-out from the HDD 103 does not generally occur at the time of access to the data block g.

Data relocation between pages is performed while the data of two pages to be subjected to relocation are cached in the RAM 102. Data relocation performed in the RAM 102 is reflected to the HDD 103 afterward. For example, if data relocation is performed on the pages 32 and 33, the cached data of the pages 32 and 33 do not match the data of the pages 32 and 33 stored in the HDD 103. Accordingly, the server apparatus 100 writes back the data of the pages 32 and 33 from the RAM 102 to the HDD 103. As in the case of write-back of updated data described above, the server apparatus 100 may perform write-back of a page on which data relocation is performed, when evicting the data of the page from the RAM 102. However, the server apparatus 100 may periodically check whether there is a page on which data relocation is performed, and perform write-back.

In the following, the cost of writing back data cached in the RAM 102 to the HDD 103 will be discussed taking into consideration both the data update illustrated in FIG. 5 and the data relocation illustrated in FIG. 6. It is assumed that the data of the pages 31, 32, and 33 is cached to the RAM 102, and after that, all the data of the pages 31, 32, and 33 is evicted from the RAM 102. It is also assumed that only the data block e of the data blocks included in the pages 31, 32, and 33 is updated while being cached.

In the case where no data relocation is performed between the pages 32 and 33, the data of the page 32 including the updated data block e, among the pages 31, 32, and 33, is written back to the HDD 103 as illustrated in FIG. 5. On the other hand, in the case where data relocation is performed between the pages 32 and 33, the data of the pages 32 and 33 among the pages 31, 32, and 33 is written back to the HDD 103. The write-back of the page 32 occurs regardless of whether data relocation is performed, whereas the write-back of the page 33 occurs only when data relocation is performed. That is, in this example, when data relocation is performed, the amount of data to be written to the HDD 103 increases by one page. The increase in the amount of data to be written may be considered as the cost of data relocation.

The characteristic (locality) that a specific data block and another specific data block are likely to be sequentially accessed is not permanent, but may change. For example, it is assumed that after the data relocation described above is performed based on the fact that the data blocks e and g are likely to be sequentially accessed, the locality changes, so that the data blocks d and f become likely to be sequentially accessed. Then, since the data block d and the data block f belong to different pages at this point, the server apparatus 100 performs data relocation between the pages 32 and 33 again. Thus, considering that the locality may change, the benefit of improving data access performance which is obtained by execution of data relocation is evaluated as a finite value.

That is, in the environment in which the locality of data access changes, there are cases in which the cost exceeds the benefit and it is therefore preferable not to perform data relocation. In view of this, the server apparatus 100 compares the cost incurred by execution of data relocation with the benefit obtained by execution of data relocation (which may also be referred to as a penalty (an opportunity cost) for not executing relocation), and determines whether to execute data relocation.

Figure 7:
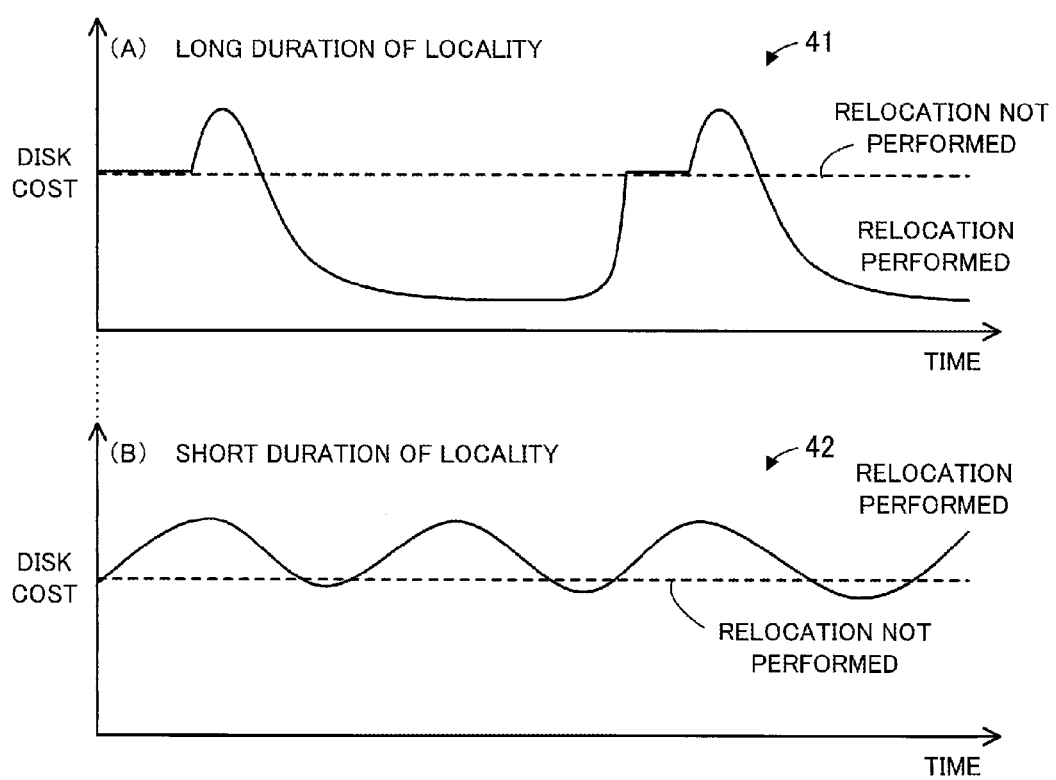
FIG. 7 illustrates examples of changes in the disk cost associated with data relocation.

FIG. 7 illustrates examples of changes in the disk cost associated with data relocation.

The disk cost discussed herein is the sum of the cost of reading data from the HDD 103 to the RAM 102 and the cost of writing back data from the RAM 102 to the HDD 103. A graph 41 illustrates changes in the disk cost in the case where the duration of the locality is long, that is, in the case where the change in locality is small. A graph 42 illustrates changes in the disk cost in the case where the duration of the locality is short, that is, in the case where the change in locality is great.

In the graph 41, when the server apparatus 100 does not perform any data relocation, cache misses occur randomly, so that read-out from the HDD 103 is stably performed. Meanwhile, since no data relocation is performed, the amount of data to be written to the HDD 103 does not increase. That is, when no data relocation is performed, the disk cost is stable at a constant level.

On the other hand, in the graph 41, when the server apparatus 100 performs data relocation, the amount of data to be written to the HDD 103 temporarily increases due to data relocation. Once the data relocation is reflected to the HDD 103, the number of cache misses decreases, so that the amount of data to be read from the HDD 103 decreases. That is, when data relocation is performed, the disk cost increases temporarily, and then decreases significantly. Since the duration of the locality is long, the reduced disk cost is maintained for some time. Subsequently, when the locality changes, the effect of the data relocation is gradually lost, so that the disk cost increases to the same level as that in the case where no relocation is performed. When the server apparatus 100 performs data relocation in accordance with the changed locality, the disk cost again increases temporarily, and then decreases significantly.

In the graph 42, when the server apparatus 100 does not perform any data relocation, the disk cost is stable at a constant level as in the case of the graph 41. On the other hand, when the server apparatus 100 performs data relocation, the disk cost increases temporarily, and then decreases. However, since the duration of the locality is short, the effect of the data relocation is quickly lost, so that the disk cost starts to increase without decreasing sufficiently. The localities between various data blocks do not change at the same time, but change separately at different timings. Therefore, the total disk cost for a plurality of pages changes gradually as illustrated in FIG. 7. That is, when data relocation is performed, the disk cost repeats increase as the cost of data relocation, slight decrease as the merit of data relocation, and increase associated with changes in locality.

When the duration of the locality is long, the value of integral of the disk cost in the case where relocation is performed is less than the value of integral of the disk cost in the case where no relocation is performed. Accordingly, if the server apparatus 100 actively performs data relocation, the disk cost decreases, so that the data access performance improves. On the other hand, when the duration of the locality is short, the value of integral of the disk cost in the case where relocation is performed is greater than the value of integral of the disk cost in the case where no relocation is performed. Accordingly, if the server apparatus 100 actively performs data relocation, the disk cost increases, so that the data access performance might be lowered. That is, since data relocation temporarily increases the disk cost, performing data relocation does not always improve the average data access performance.

In view of this, the server apparatus 100 evaluates the cost of execution of data relocation and the penalty for non-execution of data relocation, and executes data relocation only when the former is less than the latter.

Next, a description will be given of data relocation by the server apparatus 100.

Figure 8:
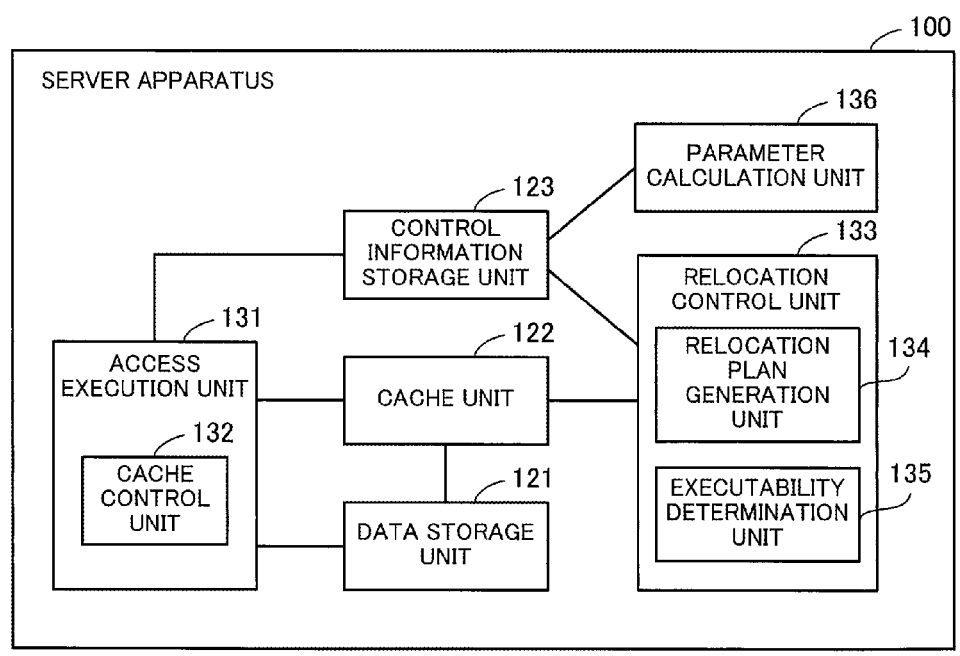
FIG. 8 is an exemplary functional block diagram of the server apparatus.

FIG. 8 is an exemplary functional block diagram of the server apparatus 100.

The server apparatus 100 includes a data storage unit 121, a cache unit 122, a control information storage unit 123, an access execution unit 131, a relocation control unit 133, and a parameter calculation unit 136. The data storage unit 121 may be implemented as a storage area reserved in the HDD 103. The cache unit 122 and the control information storage unit 123 may be implemented as storage areas reserved in the RAM 102. The access execution unit 131, the relocation control unit 133, and the parameter calculation unit 136 may be implemented as modules of a program executed by the CPU 101, for example.

The data storage unit 121 includes a plurality of pages, each of which is a physical continuous storage area and is capable of storing one or more data blocks. A data block is a unit of data that is identified by identification information and is accessed in response to an access request. For example, each data block corresponds to a tuple in a table. Reading of data from the data storage unit 121 and writing of data to the data storage unit 121 are performed in units of pages by the access execution unit 131.

The cache unit 122 is a cache memory for the data storage unit 121. The storage capacity of the cache unit 122 is less than the data storage unit 121. However, the access speed (especially, the random access speed) of the cache unit 122 is higher than that of the data storage unit 121. The data of one or more of the plurality of pages included in the data storage unit 121 is loaded to the cache unit 122 in units of pages. Data update or data relocation in response to an access request is performed on the data loaded in the cache unit 122, and is reflected to the data storage unit 121 when the data is evicted from the cache unit 122.

The control information storage unit 123 stores control information used for controlling data access, cache management, and data relocation. The control information includes search information indicating the corresponding relationships between pages and data blocks, history information indicating pairs of sequentially accessed data blocks, parameter information indicating parameters used for calculating the cost of execution of data relocation and the penalty for non-execution of data relocation, and the like. The details of the control information will be described below.

The access execution unit 131 receives an access request, and accesses data cached in the cache unit 122, in accordance with the received access request. If a read request is received, the access execution unit 131 acquires the data block specified by the read request from the cache unit 122, and returns the acquired data block. If a write request is received, the access execution unit 131 updates a data block in the cache unit 122 based on the data included in the write request, and returns information indicating whether the update is successful. Further, the access execution unit 131 updates the history information stored in the control information storage unit 123, in accordance with the received access request.

The access execution unit 131 includes a cache control unit 132. The cache control unit 132 controls loading of data from the data storage unit 121 to the cache unit 122. Upon receiving an access request specifying a data block that is not yet cached, the cache control unit 132 loads the entire data of the page including the data block from the data storage unit 121 to the cache unit 122. Upon loading the data, if there is not enough free space in the cache unit 122, the cache control unit 132 evicts data of any of the cached pages from the cache unit 122. In the case where update or relocation is performed on the data of the page to be evicted in the cache unit 122, the cache control unit 132 writes back the entire data of the page to be evicted from the cache unit 122 to the data storage unit 121.

The relocation control unit 133 analyzes the history information stored in the control information storage unit 123, and performs relocation on the data of cached pages in the cache unit 122. The relocation control unit 133 includes a relocation plan generation unit 134 and an executability determination unit 135.

The relocation plan generation unit 134 generates a relocation plan based on the current corresponding relationships between pages and data blocks and a pair of data blocks that are recently accessed sequentially, if predetermined starting conditions are satisfied. The starting conditions are determined in advance with reference to the time elapsed from the last time data relocation is considered, the amount of history information stored, and the like, for example. A relocation plan is represented using, for example, identification information of two pages on which data relocation is to be performed, and identification information of data blocks to be moved between the two pages. The relocation plan generation unit 134 considers the movement of data blocks between pages such that sequentially accessed data blocks belong to the same page as far as possible.

When the relocation plan generation unit 134 generates a relocation plan, the executability determination unit 135 calculates the execution cost and the non-execution penalty in the case where the relocation plan is adopted, using the parameter information stored in the control information storage unit 123. The execution cost is calculated taking into consideration of the increase in the number of pages to be written back to the data storage unit 121, the writing speed of the HDD 103, and so on. The non-execution penalty is calculated taking into consideration of the degree of improvement in the situation in which sequentially accessed data blocks are separated in different pages, the expectation of the number of times data blocks of a certain pair are sequentially accessed in the future, the reading speed of the HDD 103, and so on. The details of the execution cost and the non-execution penalty will be described below. The executability determination unit 135 compares the calculated execution cost with the calculated non-execution penalty. The executability determination unit 135 adopts the relocation plan if the non-execution penalty is greater than the execution cost, and does not adopt the relocation plan if the non-execution penalty is less than or equal to the execution cost.

The parameter calculation unit 136 analyzes the history information stored in the control information storage unit 123, and generates parameter information used for calculating the execution cost and the non-execution penalty. For example, the parameter calculation unit 136 analyzes, for a certain pair of data blocks, the status of appearance of sequential access in the past, and finds a prediction formula for predicting the number of times the sequential access appears in the future. The degree of duration of the locality in the server apparatus 100 is reflected to the prediction formula.

Figure 9:
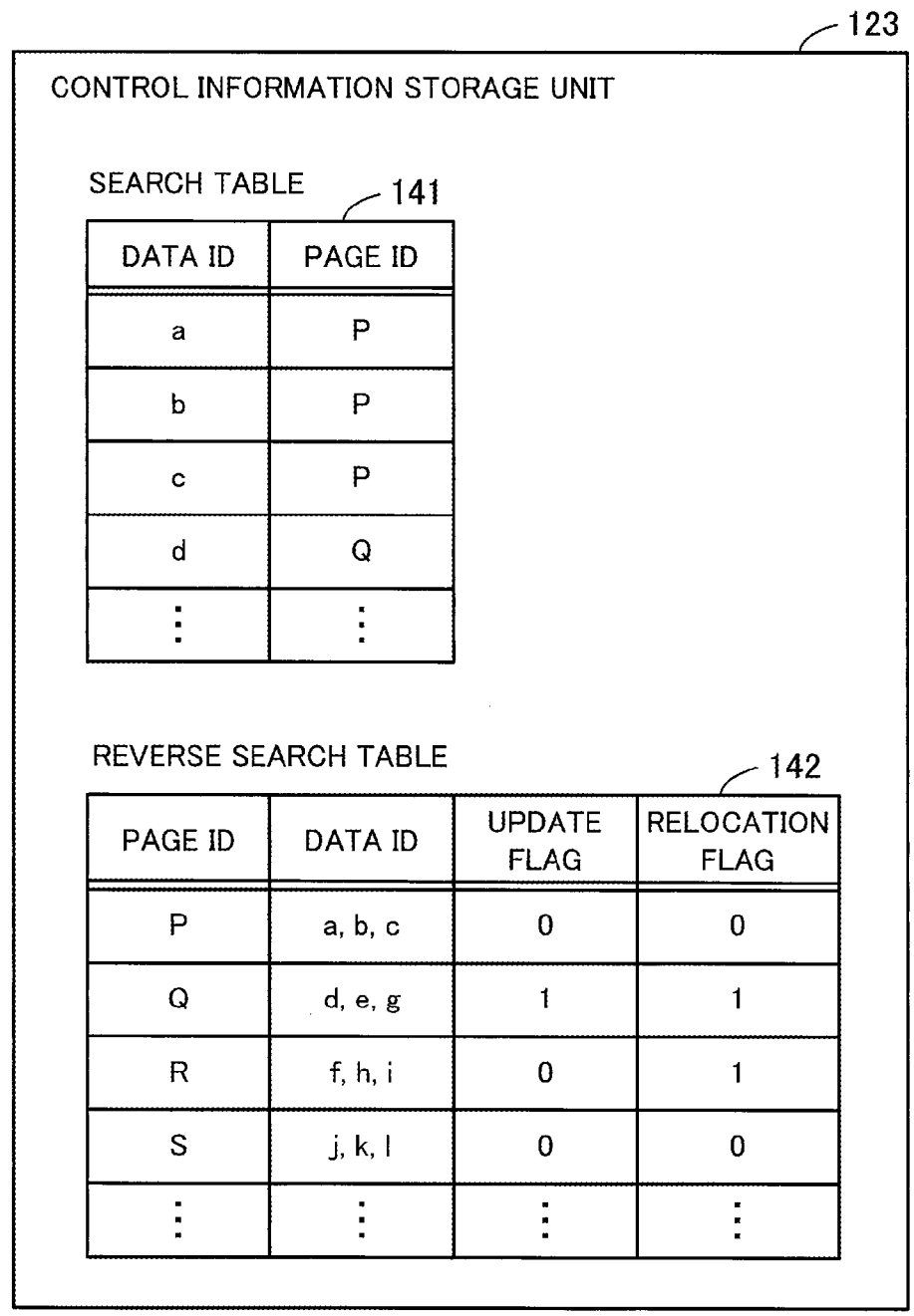
FIG. 9 illustrates an example of a search table and a reverse search table.

FIG. 9 illustrates an example of a search table 141 and a reverse search table 142.

The search table 141 is stored in the control information storage unit 123. The search table 141 has fields for data ID and page ID. The data ID is identification information that identifies a data block. The data ID may be a primary key of the table, or may be a sequential number automatically assigned by the DBMS. The page ID is identification information that identifies a page. The page ID may be an address in the HDD 103.

In the search table 141, each data ID is associated with a page ID. This indicates that the data block with a data ID belongs to the page with a page ID with which the data ID is associated. With the search table 141, it is possible to find the page ID of a page to which a certain data block belongs, based on the data ID of the certain data block.

The reverse search table 142 is stored in the control information storage unit 123. The reverse search table 142 has fields for page ID, data ID, update flag, and relocation flag. The relocation flag indicates whether, among data blocks belonging to a certain page, there is a data block updated in the cache unit 122. When the update flag=1, it means that there is an updated data block, and that the update is not yet reflected to the data storage unit 121. When the update flag=0, it means that there is no updated data block. The relocation flag indicates whether data relocation is performed on a certain page in the cache unit 122. When the relocation flag=1, it means that data relocation is performed, and that the data relocation is not yet reflected to the data storage unit 121. When the relocation flag=0, it means that no data relocation is performed.

In the reverse search table 142, each page ID is associated with no data ID or one or more data IDs, an update flag, and a relocation flag. With the reverse search table 142, it is possible to find the data IDs of all the data blocks belonging to a certain page, based on the page ID of the certain page. Further, with the reverse search table 142, it is possible to find an update flag and a relocation flag corresponding to a certain page, based on the page ID of the certain page.

Note that, as for data relocation in the cache unit 122, a data block may be moved in the RAM 102, and the storage location of the data block may be changed. Alternatively, as for data relocation in the cache unit 122, the search table 141 and the reverse search table 142 may be simply updated without changing the storage location of a data block in the RAM 102.

Figure 10:
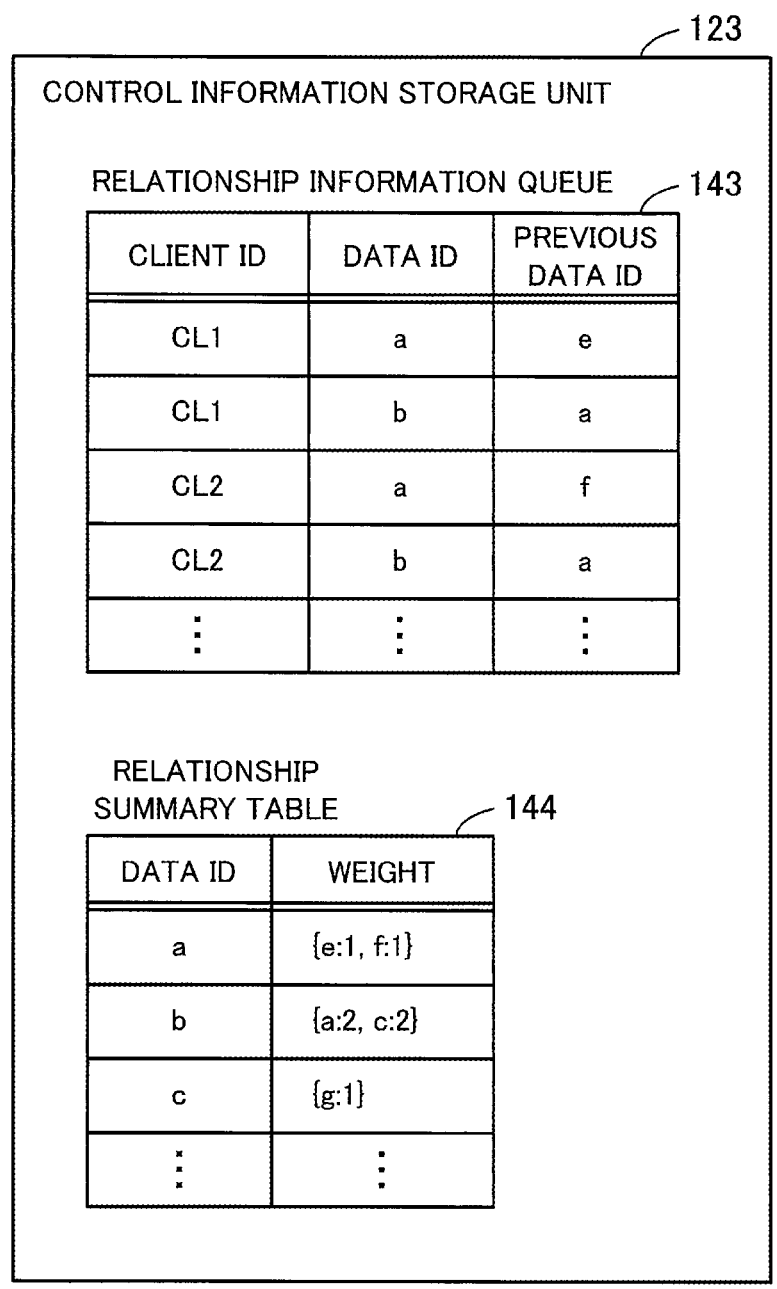
FIG. 10 illustrates an example of a relationship information queue and a relationship summary table.

FIG. 10 illustrates an example of a relationship information queue 143 and a relationship summary table 144.

The relationship information queue 143 is formed in the control information storage unit 123. The relationship information queue 143 has a First In First Out (FIFO) list structure. Each time an access request is received, relationship information is added to the relationship information queue 143.

The relationship information includes a client ID, data ID, and a previous data ID. The client ID is identification information that identifies a client apparatus which transmitted an access request. The client ID may be the communication address (for example, Internet Protocol (IP) address) of the client apparatus 21 or 22. The data ID included in the relationship information is the data ID of the data block specified by an access request. The previous data ID is the data ID of the data block specified by the previous access request transmitted from the same client apparatus.

The relationship information indicates the "relationship" between data blocks. More specifically, the relationship information indicates that the data block identified by the data ID is accessed immediately after a data block identified by the previous data ID. The immediately previously accessed data block may be specified by searching the relationship information queue 143 for the most recent relationship information related to the client apparatus by which the current access is made, for example. Note that the client apparatuses 21 and may add the data ID of the immediately previously accessed data block to an access request as a previous data ID. In the following description, a pair of data blocks identified by a data ID and a previous data ID may be referred to as a "related data pair".

The relationship information registered in the relationship information queue 143 is extracted record by record in order of registration when the relocation plan generation unit 134 generates a relocation plan. The relationship information used by the relocation plan generation unit 134 is deleted from the relationship information queue 143. Further, when data of a certain page is evicted from the cache unit 122, the relationship information on data blocks belonging to the page is deleted from the relationship information queue 143. That is, the relationship information queue 143 stores the relationship information that is related to the pages cached in the cache unit 122 and that is not yet used for considering data relocation.

The relationship summary table 144 is stored in the control information storage unit 123. The relationship summary table 144 has fields for data ID and weight. In the "weight" field, identification information indicating a data block that is accessed immediately before the data block indicated in the "data ID" field, and the number of appearances of that access sequence are registered. For example, weight information {a:2, c:2} is registered for the data block b. This indicates that access to the data block b immediately after access to the data block a has occurred two times, and access to the data block b immediately after access to the data block c has occurred two times.

Each time relationship information is added to the relationship information queue 143, that is, each time an access request is received, the relationship summary table 144 is updated in accordance with the added relationship information. With the relationship summary table 144, it is possible to find the data ID of a data block that is accessed immediately before a certain data block, and the number of appearances of the related data pair, based on the data ID of the certain block data. Further, when data of a certain page is evicted from the cache unit 122, weight information of data blocks belonging to the evicted page is deleted from the relationship summary table 144. That is, the relationship summary table 144 stores the summary of the number of appearances of each of related data pairs related to a page during a period in which the page is cached in the cache unit 122.

FIG. 11 illustrates an example of an appearance history table 145.

The appearance history table 145 is stored in the control information storage unit 123. The appearance history table 145 has fields for related data pair and the number of appearances. Each related data pair is associated with an array of the numbers of appearances. The number of appearances of the related data pair is counted in each of a plurality of periods that are segmented in accordance with a predetermined segmentation criterion. For example, the number of appearances is counted on a daily basis, such as the number of appearances on today, the number of appearances on yesterday, the number of appearances on the day before yesterday, and so on.

Each time relationship information is added to the relationship information queue 143, that is, each time an access request is received, the appearance history table 145 is updated in accordance with the added relationship information. For example, when relationship information is added to the relationship information queue 143, the number of appearances on today corresponding to the related data pair indicated by the added relationship information is incremented by 1. The appearance history table 145 is capable of storing the number of appearances during a long period of time. Although information related to a page evicted from the cache unit 122 is deleted from the relationship information queue 143 and relationship summary table 144, information related to the page evicted from the cache unit 122 may be retained in the appearance history table 145. However, information on the number of appearances that is older than a predetermined period of time may be deleted from the appearance history table 145.

FIG. 12 illustrates an example of a parameter table 146.

The parameter table 146 is stored in the control information storage unit 123. In the parameter table 146, the names and values of parameters that are used when the executability determination unit 135 calculates the execution cost and non-execution penalty of data relocation are registered. At least one or more of the values of the parameters are dynamically calculated by the parameter calculation unit 136. The values of the parameters may include a value that is statically set by the user.

The parameters include the writing speed, the reading speed, a general prediction formula, and pair-specific prediction formulas corresponding to the respective related data pairs. The writing speed indicates the time needed to write back data of a page from the RAM 102 to the HDD 103. The reading speed indicates the time needed to read data of a page from the HDD 103 to the RAM 102. The unit of each of the writing speed and reading speed may be, for example, millisecond per page.

Note that the writing speed and the reading speed may be estimated from the physical performance of the HDD 103 and the expectation of the page size by the user, and be registered in advance in the parameter table 146. Alternatively, the user may measure the writing speed and the reading speed, and register the average of the measured values in advance in the parameter table 146. Further alternatively, the parameter calculation unit 136 may monitor the writing speed and the reading speed of the HDD 103, and continuously update the values of the writing speed and the reading speed registered in the parameter table 146.

The prediction formula is a formula that predicts the number of times that a related data pair appears within a certain period of time in the future, based on the status of appearance of the related data pair in the past. The prediction formula is a linear expression "$y = u1 \times x1 + u2 \times x2 + u3 \times x3 + \ldots$". A variable y (an objective variable) represents the expectation of the number of reappearances (the reappearance expectation) of a related data pair in the future, and variables x1, x2, x3, and so on (explanatory variables) represent the feature amounts in accordance with the status of appearance in the past. The coefficients u1, u2, u3, and so on represent the weights of the feature amounts. As will be described below, the parameter calculation unit 136 calculates the coefficients u1, u2, u3, and so on, by performing a regression analysis using the appearance history table 145.

The parameter calculation unit 136 is able to calculate coefficients u1, u2, u3, and so on of a general prediction formula which is not specific to a particular related data pair, by performing a regression analysis on data of various related data pairs all at once. Further, the parameter calculation unit 136 is able to calculate coefficients u1, u2, u3, and so on of a prediction formula specific to a particular related data pair, by performing a regression analysis on data of that related data pair. The coefficients u1, u2, u3, and so on of the general prediction formula are often different from those of the plurality of pair-specific prediction formulas.

In the example described below, the variable x1 representing whether a desired related data pair appeared on the day before the reference date, the variable x2 representing whether the desired related data pair appeared two days before the reference date, the variable x3 representing the appearance rate during a certain period of time before the reference date, and the variable x4 representing the season of the reference date are used. The variable y represents the expectation of the number of times the desired related data pair appears within a certain period of time after the reference date. The period of time subject to counting of the number of appearances as the variable y (the "certain period of time" subject to calculation of the value of the variable y) may be determined based on the average period of time during which each page is continuously cached.

The prediction formula determined in the manner described above reflects the trend of duration of locality in the server apparatus 100. The number of appearances of a certain related data pair is not always stable at a constant level, but may non-linearly increase and decrease during a period from when the related data pair starts to appear in bursts to when the burst ends. Thus, by using a plurality of feature amounts related to the most recent status of appearance, it is possible to estimate the current point in the distribution of the number of appearances, and the approximate number of appearances expected in the future. However, the parameter calculation unit 136 may calculate the reappearance expectation by analyzing the distribution of the number of appearances of each related data pair in detail, instead of by performing a regression analysis using feature amounts.

Next, a description will be given of the procedure of a process executed by the server apparatus 100.

Figure 13:
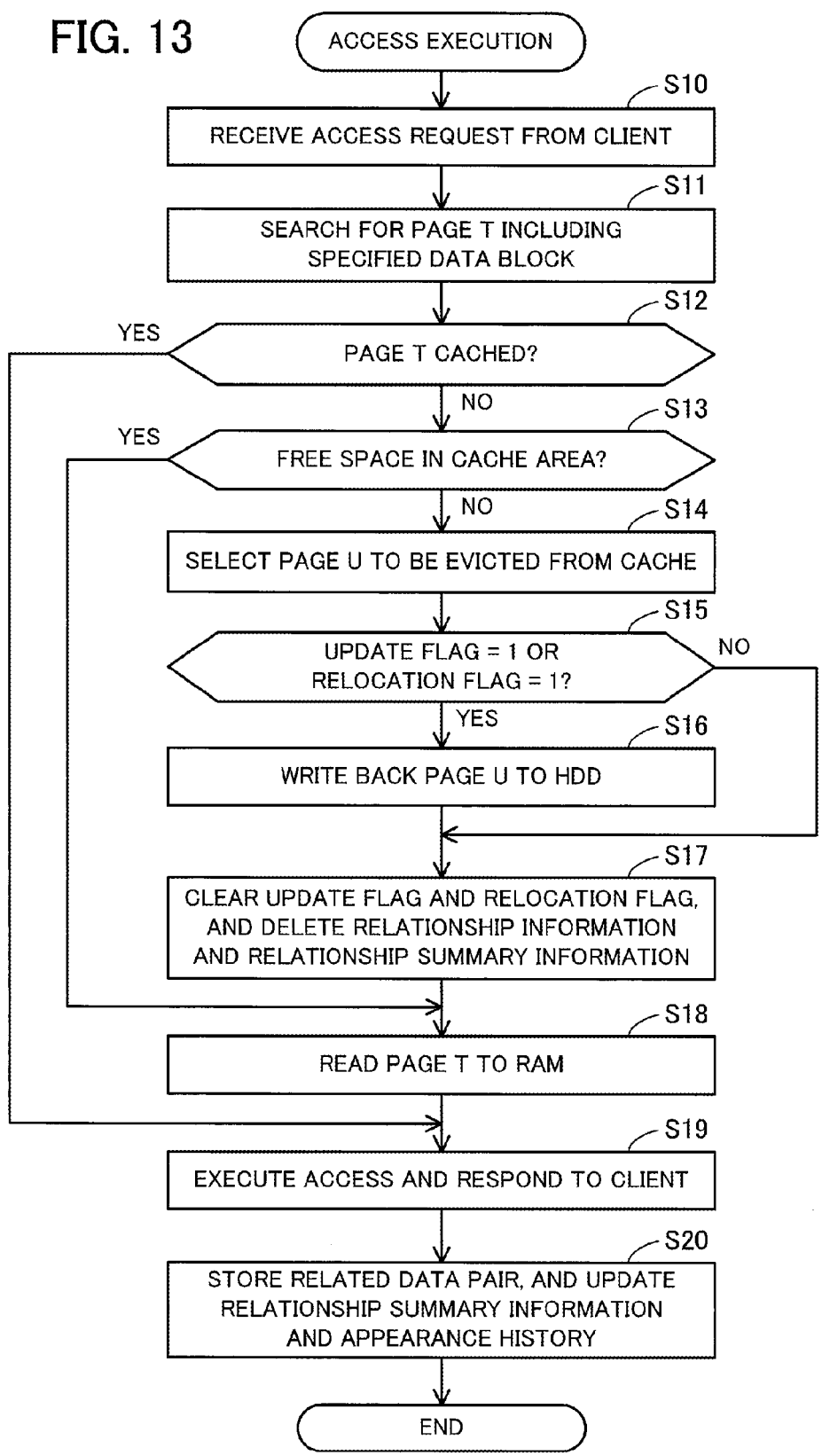
FIG. 13 is a flowchart illustrating an exemplary procedure for access execution.

FIG. 13 is a flowchart illustrating an exemplary procedure for access execution.

(S10) The access execution unit 131 receives an access request from either of the client apparatuses 21 and 22 via the network 20. The access request is a read request for reading a certain data block, a write request for updating a certain data block, or the like.

(S11) The access execution unit 131 refers to the search table 141 stored in the control information storage unit 123 so as to search for a page T including a data block specified by the access request.

(S12) The cache control unit 132 determines whether the found page T is cached, that is, the data of the page T is stored in the cache unit 122. If the found page T is cached, the process proceeds to step S19. If the page T is not yet cached, the process proceeds to step S13.

Note that in order to determine whether a page is cached, the cache control unit 132 may store a list of cached pages or a list of pages that are not yet cached. Alternatively, only information on cached pages may be registered in the reverse search table 142. Thus, the cache control unit 132 may determine whether a desired page is cached by determining whether the desired page is present in the reverse search table 142. Further alternatively, a flag indicating whether a page is cached may be added to the reverse search table 142.

(S13) The cache control unit 132 determines whether there is enough free space to store the data of the page T in the cache area of the cache unit 122. A determination as to whether there is free space in the cache area may be made based on whether the number of cached pages has reached the upper limit. If there is free space in the cache area, the process proceeds to step S18. If there is not enough free space, the process proceeds to step S14.

(S14) The cache control unit 132 selects a page U to be evicted from the cache unit 122, from among a plurality of cached pages. There are various algorithms that may be used as an algorithm (which may be referred to as a cache algorithm, a replacement algorithm, and the like) for selecting the page U. For example, algorithms such as a Least Recently Used (LRU), Least Frequently Used (LFU), FIFO, and the like may be used. The cache control unit 132 may store information corresponding to the algorithm to be used (for example, the number of accesses to a page).

(S15) The cache control unit 132 acquires an update flag and a relocation flag corresponding to the page U selected in step S14 from the reverse search table 142. Then, the cache control unit 132 determines whether the update flag=1 and whether the relocation flag=1, that is, determines whether a data block included in the page U is updated and whether data relocation is performed on the page U. If the update flag=1 or the relocation flag=1, the process proceeds to step S16. If the update flag=0 and the relocation flag=0, the process proceeds to step S17.

(S16) The cache control unit 132 writes back the entire data of the page U stored in the cache unit 122 to the data storage unit 121. That is, the data of the page U cached in the RAM 102 is written back to the HDD 103.

(S17) The cache control unit 132 clears the update flag and the relocation flag corresponding to the page U registered in the reverse search table 142 to "0". Further, the cache control unit 132 searches for data blocks included in the page U from the reverse search table 142, and deletes information on the found data blocks from the relationship information queue 143 and the relationship summary table 144. Note that the cache control unit 132 discards the data of the page U in the cache unit 122. In doing so, the cache control unit 132 may explicitly delete the data of the page U from the cache unit 122, or may allow overwriting to the storage area having been assigned to the page U without deleting the data of the page U.

(S18) The cache control unit 132 reads the entire data of the page T found in step S11 from the data storage unit 121 to the cache unit 122 in the RAM 102.

(S19) The access execution unit 131 accesses data stored in the cache unit 122 in accordance with the received access request, and responds to the client apparatus which transmitted the access request. If the access request is a read request, the access execution unit 131 extracts a data block specified by the access request from the cache unit 122, and transmits the data block to the client apparatus which transmitted the access request. If the access request is a write request, the access execution unit 131 updates a data block specified by the access request in the cache unit 122, and notifies the client apparatus which transmitted the access request of whether the update is successful. Further, if the access request is a write request, the access execution unit 131 changes the update flag of the page T registered in the reverse search table 142 to "1".

(S20) The access execution unit 131 generates relationship information in accordance with the received access request, and stores the relationship information queue 143 formed in the control information storage unit 123. The relationship information includes the identification information of the client apparatus which transmitted the access request and the identification information of the data block specified by the access request. The relationship information further includes identification information of a data block that is previously accessed in accordance with a request from the same client apparatus. The previously accessed data block may be specified by searching the relationship information queue 143 for the most recent relationship information related to that client apparatus, for example. Further, in the case where identification information of the previously accessed data block is added to the access request, the identification information may be used.

The access execution unit 131 updates the relationship summary table 144 using the generated relationship information. More specifically, the access execution unit 131 increments by 1 the weight of the previously accessed data block corresponding to the currently accessed data block, in the relationship summary table 144. Further, the access execution unit 131 updates the appearance history table 145 stored in the control information storage unit 123. More specifically, the access execution unit 131 increments by 1 the most recent number of appearances corresponding to the pair of the currently accessed data block and the previously accessed data block (the related data pair), in the appearance history table 145.

Figure 14:
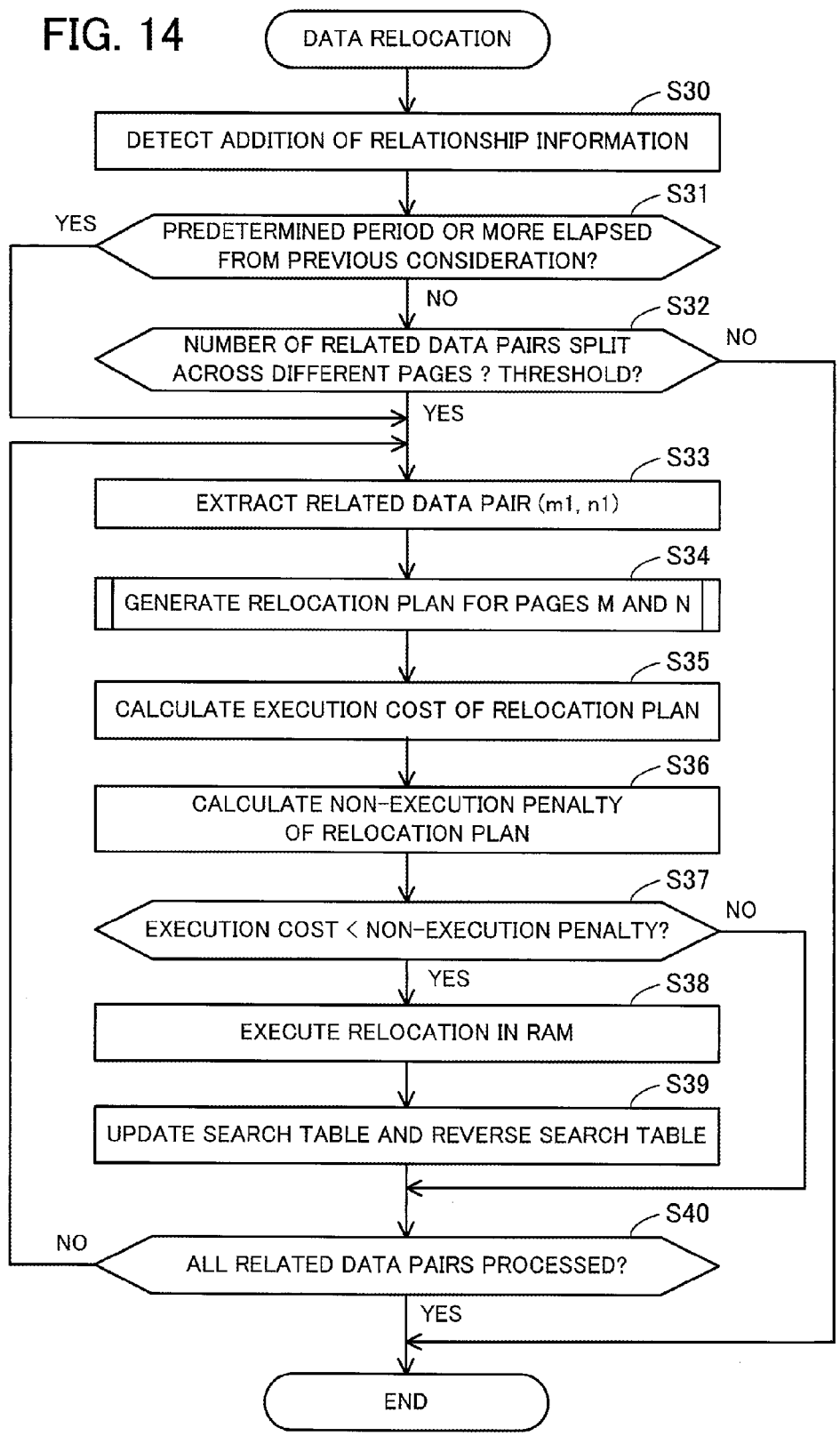
FIG. 14 is a flowchart illustrating an exemplary procedure for data relocation.

FIG. 14 is a flowchart illustrating an exemplary procedure for data relocation.

(S30) The relocation control unit 133 detects that new relationship information is added to the relationship information queue 143 formed in the control information storage unit 123.

(S31) The relocation control unit 133 determines whether a predetermined period of time or more has elapsed from the last time a consideration of data relocation of steps S33 through S40 described below was conducted. If the predetermined period of time or more has elapsed from the previous consideration of data relocation, the process proceeds to step S33 in which a consideration of data relocation is started. If the predetermined period of time or more has not elapsed, the process proceeds to step S32.

(S32) The relocation control unit 133 counts the number of related data pairs each split across pages (the number of pairs of data blocks, each pair including data blocks belonging to different pages) among related data pairs indicated by the relationship information stored in the relationship information queue 143. The page to which each data block belongs may be specified by referring to the search table 141 stored in the control information storage unit 123. Then, the relocation control unit 133 determines whether the number of related data pairs each split across pages. If the condition is satisfied, the process proceeds to step S33 in which a consideration of data relocation is started. If the condition is not satisfied, a consideration of data relocation is not started.

Note that in FIG. 14, two conditions, that is, steps S31 and S32, are used as the starting conditions for starting a consideration of data relocation. However, only either one of steps S31 and S32 may be used as a starting condition. Alternatively, another starting condition may be used in place of steps S31 and S32, or together with steps S31 and S32. For example, a condition that the amount of relationship information stored in the relationship information queue 143 has reached a threshold may be used as a starting condition.

(S33) The relocation plan generation unit 134 extracts information on a related data pair from the relationship information queue 143. The information on a related data pair to be extracted is, for example, the oldest information stored in the relationship information queue 143. The extracted information on the related data pair is deleted from the relationship information queue 143. In the following description, a currently accessed data block included in a related data pair may be denoted by m1, and a previously accessed data block may be denoted by n1.

(S34) The relocation plan generation unit 134 generates a relocation plan for relocation between a page M to which the data block m1 belongs and a page N to which the data block n1 belongs. The relocation plan may be represented using the page IDs of the pages M and N and the data ID of a data block to be moved from one of the pages to the other one of the pages (from the page M to the page N or vice versa). The details of generation of a relocation plan will be described below.

(S35) The executability determination unit 135 calculates the execution cost in the case where data relocation is executed in accordance with the relocation plan generated in step S34. The execution cost may be calculated as the increase in the number of pages to be written back×the writing speed.

As described above with reference to FIGS. 5 and 6, the increase in the number of pages to be written back may be calculated based on the update status of the pages M and N in the cache unit 122, and takes any one of the value "0", "1", and "2". The executability determination unit 135 checks the update flags of the pages M and N registered in the reverse search table 142, and calculates the number of pages with the update flag=1 (the number of updated pages) among the pages M and N. The number of pages to be written back due to data relocation is "2"−the number of updated pages. The writing speed may be specified by referring to the parameter table 146 stored in the control information storage unit 123.

(S36) The executability determination unit 135 calculates the non-execution penalty in the case where data relocation is executed in accordance with the relocation plan generated in step S34. The non-execution penalty may be calculated as the reduction in the number of cuts between the pages M and N×the reappearance expectation×the reading speed.

The number of cuts between the pages M and N is the sum of the weights of the related data pairs each split across the pages M and N among the related data pairs that are registered in the relationship summary table 144 stored in the control information storage unit 123. That is, the number of cuts between the pages M and N represents the number of appearances of a related data pair split across the pages M and N among related data pairs that appeared during the current cache period in which both the pages M and N are cached. The executability determination unit 135 refers to the relationship summary table 144 so as to calculate the number of cuts in the current allocation status and the number of cuts in the allocation status after execution of data relocation. Thus, the executability determination unit 135 calculates the reduction in the number of cuts by subtracting the latter from the former.

Among related data pairs each having been split across the pages M and N, there may be a related data pair that is fitted into either one of the pages M and N due to the data relocation so that the access performance is improved. Conversely, among related data pairs each having been fitted in either one of the pages M and N, there may be a related data pair that is split across the pages M and N due to the data relocation so that the access performance is lowered. The reduction in the number of cuts reflects an improvement in access performance for some related data pairs and a reduction in access performance for some other related data pair, and may be regarded as an index representing the general degree of improvement in the data block allocation status due to execution of data relocation.

The reappearance expectation represents the expectation of the number of times a related data pair including data blocks that respectively belong to the pages M and N appears in a certain period of time in the future, and is calculated using the prediction formula registered in the parameter table 146. For example, the executability determination unit 135 extracts related data pairs each including data blocks that respectively belong to the pages M and N from the relationship summary table 144, and calculates the values of the variables x1, x2, x3, and x4 by referring to the appearance history table 145, for each of the extracted related data pairs. Then, the executability determination unit 135 calculates, for each of the extracted related data pairs, a pair-specific reappearance expectation using the pair-specific prediction formula corresponding to that related data pair. Further, the executability determination unit 135 calculates the average values of the variables x1, x2, x3, and x4 corresponding to all the extracted related data pairs, and calculates a general reappearance expectation using the general prediction formula. The average of the pair-specific reappearance expectations and the general reappearance expectation is used for calculating the non-execution penalty.

Note that upon calculating the non-execution penalty, only one of the pair-specific reappearance expectation and the general reappearance expectation may be used. Further, reappearance expectations calculated in advance may be registered in the parameter table 146 in place of prediction formulas. The reading speed may be specified by referring to the parameter table 146.

(S37) The executability determination unit 135 compares the execution cost calculated in step S35 with the non-execution penalty calculated in step S36 so as to determine whether the non-execution penalty is greater than the execution cost. If the non-execution penalty is greater than the execution cost, the relocation plan is determined to be adopted. Then, the process proceeds to step S38. If the non-execution penalty is less than or equal to the execution cost, the relocation plan is determined not to be adopted. Then, the process proceeds to step S40.

(S38) The relocation control unit 133 executes data relocation in the cache unit 122 (in the RAM 102), in accordance with the relocation plan generated in step S34. The relocation control unit 133 may move data blocks in the RAM 102 at this point or at other points.

(S39) The relocation control unit 133 updates the search table 141 and the reverse search table 142. More specifically, the relocation control unit 133 searches the search table 141 for information on data blocks to be moved between the pages M and N, and rewrites the page IDs associated with the found data blocks. Further, the relocation control unit 133 searches the reverse search table 142 for information on the pages M and N, and rewires the data IDs associated with the pages M and N. Further, the relocation control unit 133 changes the relocation flags of the pages M and N to "1".

(S40) The relocation plan generation unit 134 determines whether information on all the related data pairs is extracted from the relationship information queue 143, that is, whether the relationship information queue 143 is empty. If the relationship information queue 143 is empty, the consideration of data relocation ends. If the relationship information queue 143 is not empty, the process proceeds to step S33.

Next, a description will be given of generation of a relocation plan in step S34. In the following, a centroid method and a union split method will be described as examples of the method of generating a relocation plan.

Figure 15:
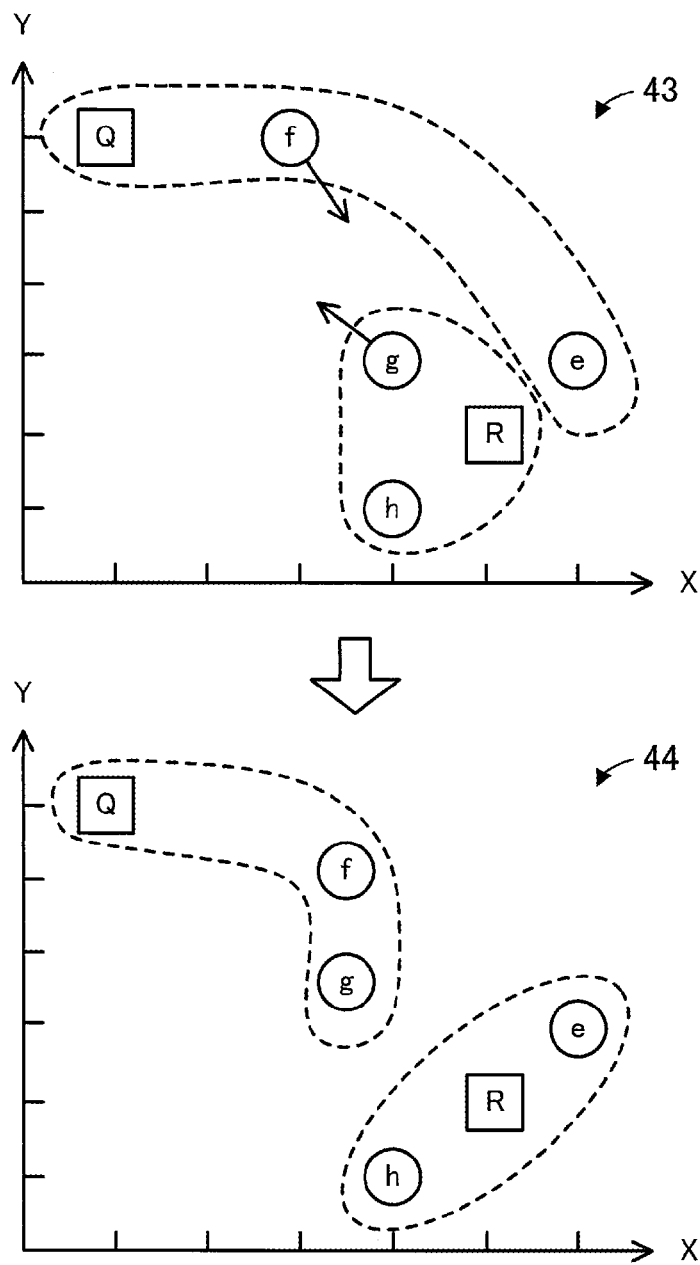
FIG. 15 illustrates an example of data relocation with a centroid method.

FIG. 15 illustrates an example of data relocation with the centroid method.

According to the centroid method, data blocks are divided into groups in an N-dimensional space (N is an integer greater than or equal to 2) in which the strength of the relationship between data blocks (the likelihood of data blocks being sequentially accessed) is represented as the distance in the N-dimensional space. In this example, a two-dimensional space is used. A graph 43 represents the relationships before information on the related data pairs extracted from the relationship information queue 143 is applied. A graph 44 represents the relationships after the extracted information on the related data pairs is applied.

With the centroid method, each page and each data block are assigned coordinates. Pages are assigned coordinates in advance such that coordinates of the pages are sufficiently away from each other. The initial values of the coordinates of each data block are assigned so as to be close to the coordinates of the page to which that data block belongs. In the graph 43, the pages Q and R (pages 32 and 33) and the data blocks e, f, g, and h are located.

In the initial state, the data blocks e and f are classified into the same group as the page 32, and the data blocks g and h are classified into the same group as the page 33 using a predetermined grouping method. One possible grouping method is that each page draws, in turn, a data block with the coordinates closest to that page among data blocks that are not yet classified into any group to the same group as that page, for example. In the case of the graph 43, in the first round, the page Q selects the data block f, and the page R selects the data block g. In the second round, the page Q selects the data block e, and the page R selects the data block h. Thus, grouping is performed such that the data blocks e and f belong to the page Q, and the data blocks g and h belong to the page R.

When the relocation plan generation unit 134 extracts information on a related data pair from the relationship information queue 143, the coordinates of data blocks corresponding to the related data pair are changed. More specifically, the coordinates of one of the data block are shifted toward the other one of the data blocks. In the case where the data block g is accessed immediately after the data block f, the coordinates of the data block f are shifted toward the coordinates of the page R, and the coordinates of the data block g are shifted toward the coordinates of the page Q in the graph 43. This indicates that the relationship between the data block f and the page R is stronger than that at present, and the relationship between the data block f and the page Q is stronger than that at present. The amount of the shift of the coordinates may be a constant amount. Alternatively, the amount of the shift of the coordinates may be a constant percentage (for example, 10%) of the distance between the coordinates of the data block and the coordinates of the target page (for example, the distance between the coordinates of the data block f and the coordinates of the page R).

When coordinates of data blocks are changed in the two-dimensional space, groups of data blocks are calculated again using the grouping method described above. For example, in the case of the graph 44, in the first round, the page Q selects the data block f, and the page R selects the data block h. In the second round, the page Q selects the data block g, and the page R selects the data block e. Thus, the data blocks f and g are classified into the same group as the page Q, and the data blocks e and h are classified into the same group as the page R. This is a relocation plan for moving the data block e from the page Q to the page R, and moving the data block g from the page R to the page Q.

FIG. 16 illustrates an example of a coordinate table 147.

In the case where the centroid method is used for generation of a relocation plan, the coordinate table 147 is stored in the control information storage unit 123. The coordinate table 147 has fields for node ID and coordinates. The node ID is identification information of a node located in the N-dimensional space. As the node ID, a page ID is used for a page, and a data ID is used for a data block. The current coordinates in the N-dimensional space is associated with the node ID. As described above, the coordinates corresponding to a data block may be updated by the relocation plan generation unit 134. Even when a page is evicted from the cache unit 122, information on the page does not need to be deleted from the coordinate table 147.

Figure 17:
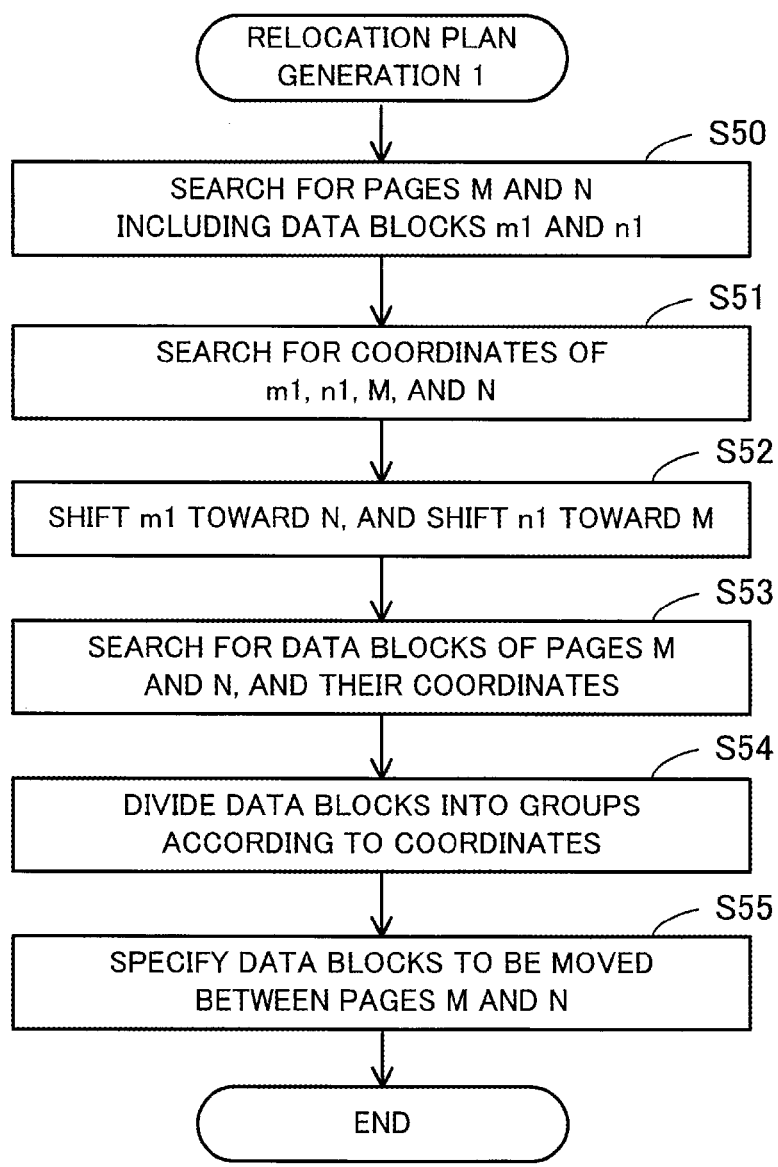
FIG. 17 is a flowchart illustrating an exemplary procedure for first relocation plan generation.

FIG. 17 is a flowchart illustrating an exemplary procedure for first relocation plan generation.

The first relocation plan generation is performed in step S34 described above.

(S50) The relocation plan generation unit 134 searches the search table 141 stored in the control information storage unit 123 for the page M including the data block m1 and the page N including the data block n1.

(S51) The relocation plan generation unit 134 searches the coordinate table 147 stored in the control information storage unit 123 for the coordinates corresponding to the data blocks m1 and n1 and the pages M and N.

(S52) The relocation plan generation unit 134 shifts the coordinates of the data block m1 toward the coordinates of the page N. For example, the relocation plan generation unit 134 changes the coordinates of the data block m1 such that the distance between the coordinates of the data block m1 and the coordinates of the page N is reduced by 10%, in the coordinate table 147. Further, the relocation plan generation unit 134 shifts the coordinates of the data block n1 toward the coordinates of the page M. For example, the relocation plan generation unit 134 changes the coordinates of the data block n1 such that the distance between the coordinates of the data block n1 and the coordinates of the page M is reduced by 10%, in the coordinate table 147.

(S53) The relocation plan generation unit 134 searches the reverse search table 142 stored in the control information storage unit 123 for all the data blocks included in the pages M and N. The relocation plan generation unit 134 searches the coordinate table 147 for the coordinates of each of the found data blocks.

(S54) The relocation plan generation unit 134 divides the data blocks found in step S54 into groups based on the coordinates of the data blocks and the coordinates of the pages M and N. Upon grouping, the distance from the coordinates of the pages M and N to the coordinates of each of the data blocks is taken into consideration. It is preferable that data blocks close to the page M be located on the page M, and data blocks close to the page N be located on the page N. For example, the pages M and N alternately select a data block which is the closest among unselected data blocks.

(S55) The relocation plan generation unit 134 compares the current data allocation of the pages M and N with the data allocation of the pages M and N calculated in step S54 so as to specify data blocks to be moved between the pages M and N. Thus, a relocation plan for the pages M and N is generated.

Figure 18:
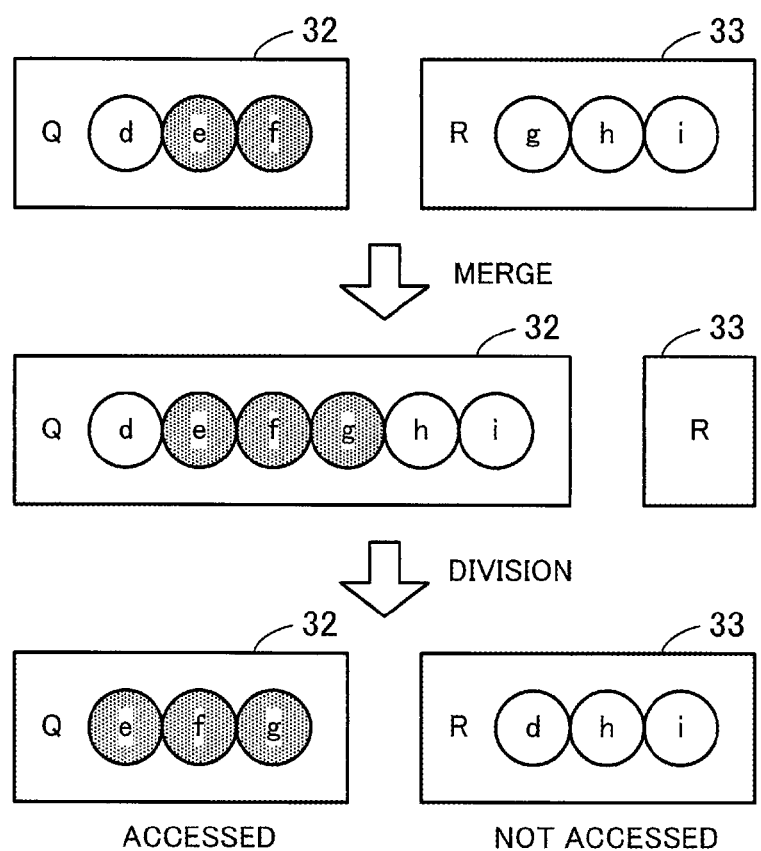
FIG. 18 illustrates an example of data relocation with a union split method.

FIG. 18 illustrates an example of data relocation with the union split method.

According to the union split method, when the relocation plan generation unit 134 extracts information on a related data pair from the relationship information queue 143, two pages indicated by the related data pair are merged. Upon merging the pages, all the data blocks belonging to one of the pages are moved to the other one of the pages. The one of the pages after the merge is an empty page not including any data block.

However, there may be a case in which the data amount of data blocks included in the other page after the merge is greater than the upper limit. In this case, the other page after the merge is divided in accordance with the access status of each of the data blocks. Upon dividing the page, the data blocks gathered in the other page are divided into a group of those accessed while being cached in the cache unit 122 in the current cache period and a group of those not accessed. Then, the data blocks of either one of the groups are moved.

For example, it is assumed that the page 32 (page Q) including the data blocks d, e, and f and the page 33 (page R) including the data blocks g, h, and i are cached in the cache unit 122. It is further assumed that the data block f is accessed immediately after the data block e, and the data block g is accessed immediately after the data block f, during the current cache period. Then, the page Q and the page R are merged. For example, the data blocks g, h, and i included in the page R are moved to the page Q. As the result, the page Q includes the data blocks d, e, f, g, h, and i, and the page R is empty.

However, in the case where the data amount of data blocks included in the page Q exceeds a predetermined upper limit due to the movements described above, the data blocks d, e, f, g, h, and i are divided into a group of the data blocks e, f, and g which are accessed while being cached, and a group of the data blocks d, h, and i which are not accessed while being cached. Then, the page Q is divided. For example, the data blocks d, h, and i that are not accessed while being cached are moved from the page Q to the page R. As the result, the page Q includes the data blocks e, f, and g, and the page R includes the data blocks d, h, and i.

Figure 19:
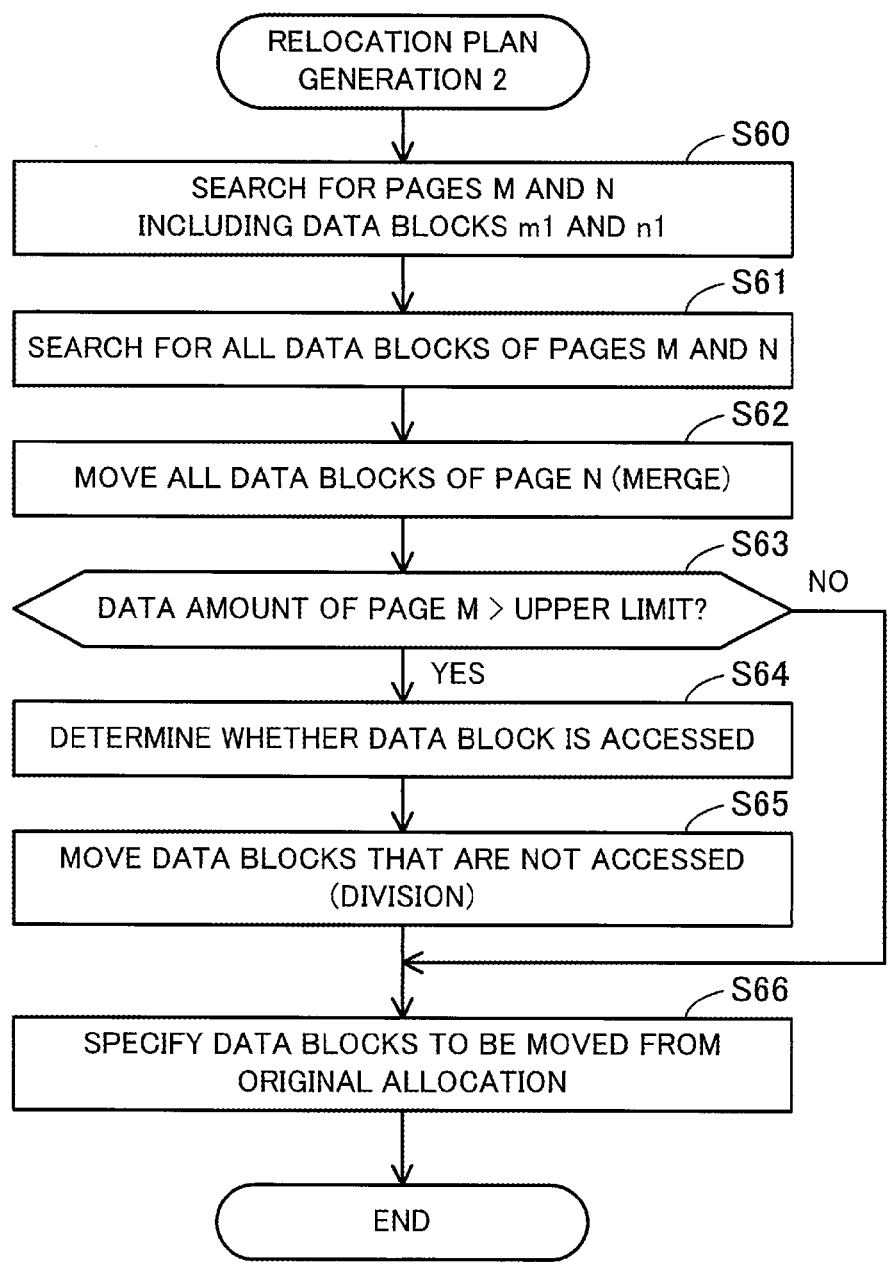
FIG. 19 is a flowchart illustrating an exemplary procedure for second relocation plan generation.

FIG. 19 is a flowchart illustrating an exemplary procedure for second relocation plan generation.

The second relocation plan generation is performed in step S34 described above.

(S60) The relocation plan generation unit 134 searches the search table 141 stored in the control information storage unit 123 for the page M including the data block m1 and the page N including the data block n1.

(S61) The relocation plan generation unit 134 searches the reverse search table 142 stored in the control information storage unit 123 for all the data blocks included in the pages M and N.

(S62) The relocation plan generation unit 134 generates a relocation plan for merging the pages M and N. More specifically, the relocation plan generation unit 134 generates a relocation plan for moving all the data blocks included in the page N to the page M. According to this relocation plan, the page N becomes empty.

(S63) The relocation plan generation unit 134 determines whether the data amount of the page M (for example, the number of data blocks) is greater than an upper limit in the case where the relocation plan generated in step S62 is adopted. If the data amount of the page M is greater than the upper limit, the process proceeds to step S64. If the data amount of the page M is less than or equal to the upper limit, the process proceeds to step S66.

(S64) The relocation plan generation unit 134 determines whether each of the data blocks gathered in the page M is accessed while being cached in the cache unit 122 in the current cache period. A determination as to whether each data block is accessed may be made based on whether information on that data block is registered in the relationship summary table 144 stored in the control information storage unit 123.

(S65) The relocation plan generation unit 134 modifies the relocation plan generated in step S62 such that the page M is divided in accordance with the determination that is made in step S64 as to whether each data block is accessed. More specifically, the relocation plan generation unit 134 modifies the relocation plan such that, of the data blocks that are gathered in the page M, the data blocks that are not accessed are moved to the page N.

(S66) The relocation plan generation unit 134 specifies data blocks to be moved from the current data allocation of the pages M and N, based on the relocation plan generated in step S62 or the relocation plan modified in step S65. Thus, the relocation plan for the pages M and N is fixed.

Note that the relocation plan generation unit 134 may use any one of a plurality of relocation plan generation methods including the centroid method and the union split method. The relocation plan generation method to be used may be set in advance in the relocation plan generation unit 134 by the user. The centroid method is able to gradually change the data allocation in accordance with increase in the number of appearances of a related data pair, and is advantageous in being suitable for long-term optimization of the data location. The union split method is advantageous in being able to quickly modify the data allocation in response to appearance of a new related data pair.

The following is a supplementary explanation of the reduction in the number of cuts calculated in the above step S36.

Figure 20:
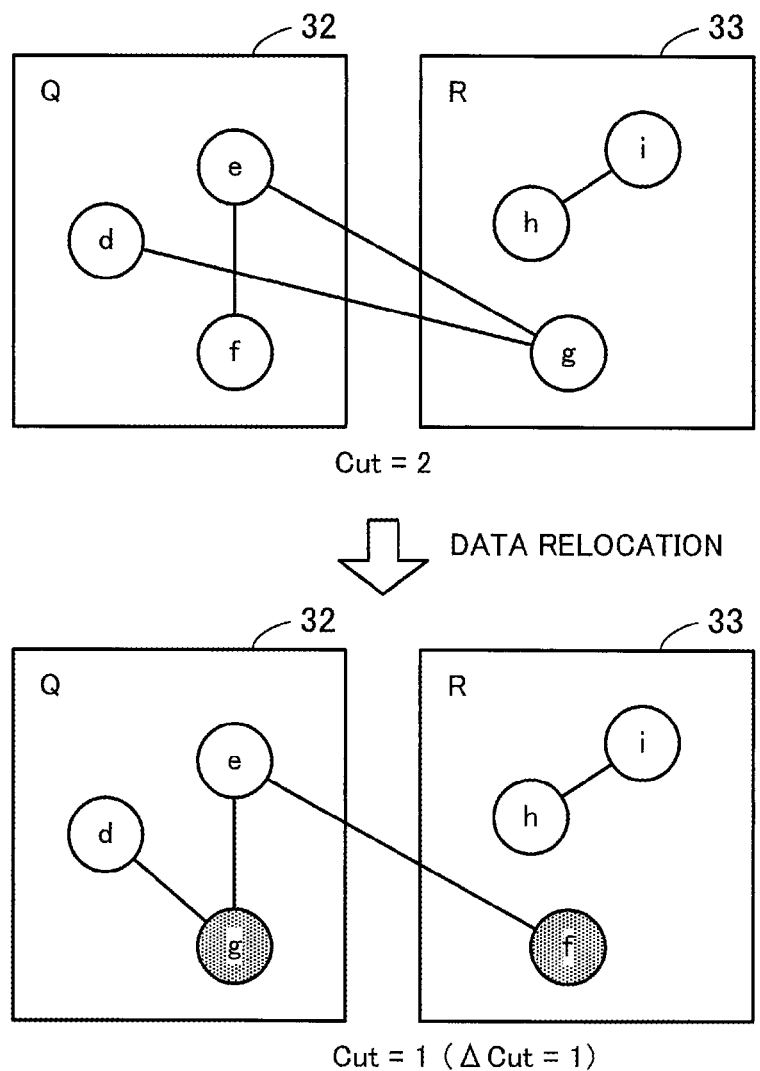
FIG. 20 illustrates an example of a change in the number of cuts before and after data relocation.

FIG. 20 illustrates an example of a change in the number of cuts before and after data relocation.

In this example, it is assumed that the page 32 (page Q) includes data blocks d, e, and f, and the page 33 (page R) includes the data blocks g, h, and i. It is also assumed that the data blocks d and g are sequentially accessed; the data blocks e and f are sequentially accessed; the data blocks e and g are sequentially accessed; and the data blocks h and i are sequentially accessed. It is also assumed that a relocation plan for moving the data block f to the page R and moving the data block g to the page Q is generated.

Before the data relocation, the related data pair including the data blocks d and g and the related data pair including the data blocks e and g are each split across the pages Q and R. Accordingly, the number of cuts before the data relocation is "2". On the other hand, according to the generated relocation plan, neither the related data pair including the data blocks d and g nor the related data pair including the data blocks e and g is split across the pages Q and R, but the related data pair including the data blocks e and f is split across the pages Q and R, after the data relocation. Accordingly, the number of cuts after the data relocation is "1", and the reduction in the number of cuts ($\Delta$Cut) is calculated as "1". That is, $\Delta$Cut reflects the quality of the generated relocation plan.

Next, a description will be given of a method of calculating a prediction formula for the reappearance expectation.

FIG. 21 illustrates an example of a regressor table 148.

The parameter calculation unit 136 calculates pair-specific prediction formulas and a general prediction formula using the appearance history table 145, periodically or in response to an instruction from the user, and registers the prediction formulas in the parameter table 146. Upon calculating a prediction formula, the regressor table 148 is generated in the control information storage unit 123 by the parameter calculation unit 136. The regressor table 148 has fields for one-day-before flag, two-days-before flag, past appearance rate, season, and the number of appearances in the future.

The one-day-before flag is an explanatory variable in the regression analysis, and corresponds to the variable $x_1$ described above. The one-day-before flag indicates whether a certain related data pair appeared one or more times one day before the reference date. If the related data pair appeared one or more times, then the one-day-before flag=1. If the related data pair did not appear, then the one-day-before flag=0. The two-days-before flag is an explanatory variable in the regression analysis, and corresponds to the variable $x_2$ described above. The two-days-before flag indicates whether a certain related data pair appeared one or more times two days before the reference date. If the related data pair appeared one or more times, then the two-days-before flag=1. If the related data pair did not appear, then the two-days-before flag=0.

The past appearance rate is an explanatory variable in the regression analysis, and corresponds to the variable $x_3$ described above. The past appearance rate represents the rate of the number of days on which a certain related data pair appeared one or more time within a predetermined number of days before the reference date. For example, if a certain related data pair appeared for 3 days and not appeared for 7 days within 10 days before the reference date, the past appearance rate is 0.3. The season is an explanatory variable in the regression analysis, and corresponds to the variable $x_4$ described above. The spring is represented as "0"; the summer is represented as "1"; the fall is represented as "2"; and the winter is represented as "3". The number of appearances in the future is an objective variable in the regression analysis, and corresponds to the variable y described above. The number of appearances in the future represents the number that a certain data block appeared within a predetermined number of days after the reference date.

The parameter calculation unit 136 selects a reference date, and calculates the one-day-before flag, the two-days-before flag, the past appearance rate, the season, and the number of appearances in the future, based on the number of appearances on the days around the reference date, for each of the related data pairs registered in the appearance history table 145. The parameter calculation unit 136 calculates the one-day-before flag, the two-days-before flag, the past appearance rate, the season, and the number of appearances in the future, for each of a plurality of reference dates. The plurality of reference dates are spaced at intervals of a certain number of days or more. Then, the parameter calculation unit 136 performs, for each of the related data pairs, a regression analysis using the values of the explanatory variables and objective variables obtained with different reference dates, and calculates the coefficients of the pair-specific prediction formula of that related data pair. Further, the parameter calculation unit 136 performs a regression analysis using the values of the explanatory variables and the objective variables of all the related data pairs together, and calculates the coefficients of the general prediction formula.

Figure 22:
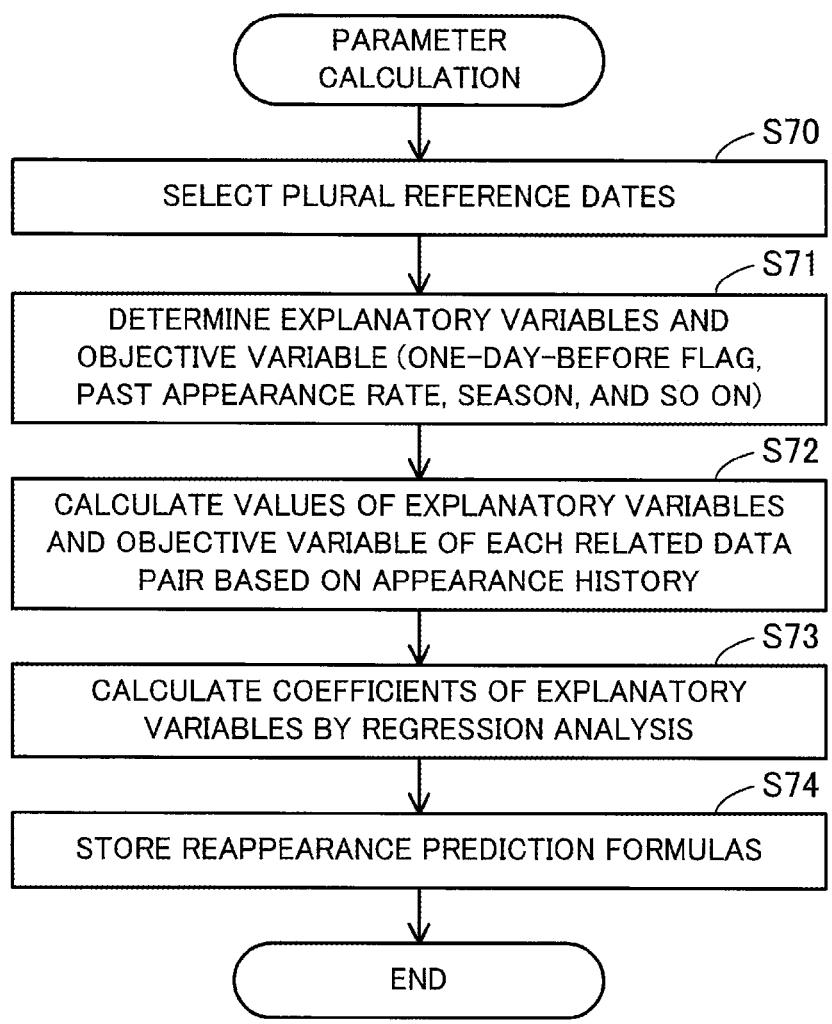
FIG. 22 is a flowchart illustrating an example of the procedure for parameter calculation.

FIG. 22 is a flowchart illustrating an example of the procedure for parameter calculation.

(S70) The parameter calculation unit 136 selects a plurality of reference dates.

(S71) The parameter calculation unit 136 determines explanatory variables and an objective variable. For example, the one-day-before flag (variable $x_1$), the two-days-before flag (variable $x_2$), the past appearance rate (variable $x_3$), the season (the variable $x_4$) are used as explanatory variables, and the number of appearances in the future (variable y) are used as an objective variable. As for the past appearance rate and the number of appearances in the future, the length of the period subject to calculation is also determined. Note that feature amounts other than those described above may be used as explanatory variables representing the status of appearance of a related data pair in the past.

(S72) The parameter calculation unit 136 calculates the values of the explanatory variables and the value of the objective variable, using the appearance history table 145 registered in the control information storage unit 123, for each of different combinations of a related data pair and a reference date, and registers the values in the regressor table 148.

(S73) The parameter calculation unit 136 performs a regression analysis using the values registered in the regressor table 148, and thereby calculates the coefficients (weights) of the explanatory variables. For example, the parameter calculation unit 136 calculates the coefficient u1 of the one-day-before flag, the coefficient u2 of the two-days-before flag, the coefficient u3 of the past appearance rate, and the coefficient u4 of the season. In this step, by performing a regression analysis using the values of each related data pair, coefficients specific to that related data pair are calculated. Further, by performing a regression analysis using the values of all the related data pairs together, general coefficients are calculated.

(S74) The parameter calculation unit 136 stores the prediction formulas including the coefficients calculated in step S73 in the parameter table 146. The prediction formulas include pair-specific prediction formulas for calculating reappearance expectations of the respective related data pairs, and a general prediction formula for calculating an average reappearance expectation. For example, the following prediction formula is obtained: the reappearance expectation (y)=−3×one-day-before flag (x1)−1×two-days-before flag (x2)+2×the past appearance rate (x3)+0.03×the season (x4).

FIG. 23 illustrates an example of a change in a reappearance prediction formula.

In the server apparatus 100, if the time distribution of the number of appearances of the same related data pair or the trend of duration of locality changes, the difference between a reappearance expectation calculated by the prediction formula and the actual number of appearances might be increased. In this case, it is preferable to update the prediction formula. For example, in FIG. 23, the three samples registered in the upper half of the regressor table 148 fit a prediction formula of the number of appearances in the future=the one-day-before flag+10×the past appearance rate. On the other hand, the two samples registered in the lower half of the regressor table 148 fit a prediction formula of the number of appearances in the future=two-days-before flag+10×the past appearance rate. This indicates the possibility that the time distribution of the number of appearances or the trend of duration of locality in the server apparatus 100 has changed.

Next, a description will be given of a modification of the configuration of an information processing system according to a second embodiment. In the above description, the server apparatus 100 centrally manages data. However, a plurality of server apparatuses may manage data in a distributed manner.

Figure 24:
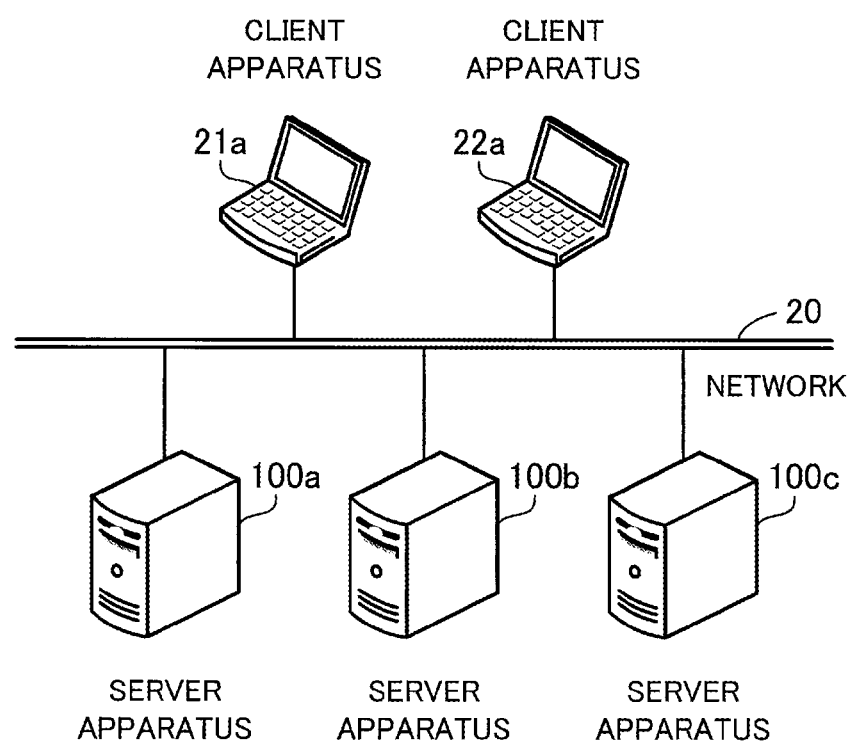
FIG. 24 illustrates another example of an information processing system.

FIG. 24 illustrates another example of an information processing system.

An information processing system according to a modification includes client apparatuses 21a and 22a, and server apparatuses 100a, 100b, and 100c. The client apparatuses 21a and 22a and the server apparatuses 100a, 100b, and 100c are connected to a network 20.

The server apparatuses 100a, 100b, and 100c store data of a plurality of pages in a distributed manner. For example, the server apparatus 100a stores the data of the page 31; the server apparatus 100b stores the data of the page 32; and the server apparatus 100c stores the data of the page 33.

If the server apparatus storing a data block which the client apparatuses 21 and 22a wish to access is known, the client apparatuses 21 and 22a transmit an access request to the server apparatus. On the other hand, if the server apparatus storing a data block which the client apparatuses 21 and 22a wish to access is not known, the client apparatuses 21 and 22a may transmit an access request to all the server apparatuses 100a, 100b, and 100c, or may transmit an access request to an arbitrary one of the server apparatuses. In the former case, only the server apparatus that stores the data block specified by the access request may respond to the source of the access request. In the latter case, the server apparatus having received the access request transfers the access request to the server apparatus storing the data block specified by the access request. The server apparatuses 100a, 100b, and 100c store information on the corresponding relationships between pages and server apparatuses.

In order to detect the sequentiality of access, the server apparatuses 100a, 100b, and 100c report the data block ID of the data block specified by the received access request to each other. Alternatively, the client apparatuses 21a and 22a add the data ID of the previously accessed data block to the access request. In this way, each of the server apparatuses 100a, 100b, and 100c is able to collect relationship information on data blocks stored in that server apparatus. Each of the server apparatuses 100a, 100b, and 100c may generate a relocation plan for the pages managed in that server apparatus using the collected relationship information, and execute data relocation. If one of two pages on which data relocation is performed is stored in another server apparatus, data blocks are moved between the server apparatuses.

According to the information processing system of the second embodiment, locations of data blocks in the HDD 103 are dynamically changed such that sequentially accessed data blocks are located in the same page as far as possible. This reduces the number of cache misses, and reduces the amount of data to be read from the HDD 103 that is slow for random access. Thus, it is possible to improve the access performance. Further, since data relocation is performed while data is cached in the RAM 102, it is possible to reduce writing of data to the HDD 103.

Further, when a relocation plan is generated in response to occurrence of a sequential access, the execution cost and the non-execution penalty of the generation relocation plan are calculated. Then, the relocation plan is adopted only when the non-execution penalty is greater than the execution penalty. The increase in the amount of data to be written to the HDD 103 is reflected to the execution cost. The quality of the relocation plan and the trend of duration of locality in the server apparatus 100 are reflected to the non-execution penalty. Thus, it is possible to prevent a reduction in data access performance due to execution of data relocation. For example, if the effect of reducing sequential access across pages is small, or if the predicted number of appearances of sequential accesses having the same pattern is small, the relocation plan is determined not to be adopted. Further, if there is a great increase in the amount of data to be written to the HDD 103, the relocation plan is determined not to be adopted.

As mentioned above, the information processing in the first embodiment may be realized by causing a computer to execute the program. Further, the information processing in the second embodiment may be realized by causing the client apparatuses 21 and 22 (or the client apparatuses 21a and 22a) and the server apparatus 100 (or the server apparatuses 100a, 100b, and 100c) to execute the program.

The program may be recorded in a computer-readable storage medium (for example, the storage medium 113). Examples of storage media include a magnetic disk, an optical disc, a magneto-optical disk, a semiconductor memory, and the like. Magnetic disks include FD and HDD. Optical discs include CD, CD-Recordable (CD-R), CD-Rewritable (CD-RW), DVD, DVD-R, and DVD-RW. The program may be stored in a portable storage medium so as to be distributed. In this case, the program may be copied from the portable storage medium to another storage medium such as an HDD or the like (for example, the HDD 103) so as to be executed.

According to an aspect, it is possible to prevent excessive relocation of data.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A non-transitory computer-readable storage medium storing therein a data allocation control program that causes a computer to perform a process comprising:
    receiving access to a plurality of data blocks that are classified and located in a plurality of storage areas in a storage device;
    updating access information, when access to a second data block located in a second storage area of the plurality of storage areas occurs immediately after access to a first data block located in a first storage area of the plurality of storage areas, based on identification information of the first data block and identification information of the second data block, the access information indicating an access sequence of the plurality of data blocks;
    searching for, among pairs of sequentially accessed data blocks indicated by the access information, first pairs each split across the first storage area and the second storage area in an allocation status, and second pairs each split across the first storage area and the second storage area in another allocation status, the allocation status indicating allocation of the plurality of data blocks before relocation of a first data group related to the first data block and a second data group related to the second data block, said another allocation status indicating allocation of the plurality of data blocks after the relocation;
    calculating an evaluation value based on a difference between a number of the first pairs and a number of the second pairs; and
    comparing the evaluation value with a threshold, and determining whether to perform the relocation based on the comparing.

2. The non-transitory computer-readable storage medium according to claim 1, wherein the calculating includes counting a number of times the first data block and the second data block are sequentially accessed, and determining a value of a parameter used for calculating the evaluation value based on statistical information of the counted number of times.

3. A data allocation control apparatus comprising:
    a memory;
    a storage device in which a plurality of data blocks are classified and located in a plurality of storage areas; and
    a processor configured to perform a process including:
        updating access information, when access to a second data block located in a second storage area of the plurality of storage areas occurs immediately after access to a first data block located in a first storage area of the plurality of storage areas, based on identification information of the first data block and identification information of the second data block, the access information indicating an access sequence of the plurality of data blocks,
        searching for, among pairs of sequentially accessed data blocks indicated by the access information, first pairs each split across the first storage area and the second storage area in an allocation status, and second pairs each split across the first storage area and the second storage area in another allocation status, the allocation status indicating allocation of the plurality of data blocks before relocation of a first data group related to the first data block and a second data group related to the second data block, said another allocation status indicating allocation of the plurality of data blocks after the relocation,
        calculating an evaluation value based on a difference between a number of the first pairs and a number of the second pairs, and
        comparing the evaluation value with a threshold, and determining whether to perform the relocation based on the comparing.

4. A data allocation control method comprising:
    receiving access to a plurality of data blocks that are classified and located in a plurality of storage areas in a storage device;
    updating, by a processor, access information, when access to a second data block located in a second storage area of the plurality of storage areas occurs immediately after access to a first data block located in a first storage area of the plurality of storage areas, based on identification information of the first data block and identification information of the second data block, the access information indicating an access sequence of the plurality of data blocks;
    searching for, by the processor among pairs of sequentially accessed data blocks indicated by the access information, first pairs each split across the first storage area and the second storage area in an allocation status, and second pairs each split across the first storage area and the second storage area in another allocation status, the allocation status indicating allocation of the plurality of data blocks before relocation of a first data group related to the first data block and a second data group related to the second data block, said another allocation status indicating allocation of the plurality of data blocks after the relocation;

calculating, by the processor, an evaluation value based on a difference between a number of the first pairs and a number of the second pairs; and comparing, by the processor, the evaluation value with a threshold, and determining whether to perform the relocation based on the comparing.

\* \* \* \* \*